US011997688B2

(12) United States Patent
Liu et al.

(10) Patent No.: US 11,997,688 B2
(45) Date of Patent: May 28, 2024

(54) METHODS, APPARATUS AND SYSTEMS FOR INDICATING UPLINK TRANSMISSION RESOURCES RELATED TO VARIOUS SERVICES

(71) Applicant: ZTE CORPORATION, Guangdong (CN)

(72) Inventors: Xing Liu, Guangdong (CN); Peng Hao, Guangdong (CN); Xianghui Han, Guangdong (CN); Jing Shi, Guangdong (CN); Haigang He, Guangdong (CN); Chenchen Zhang, Guangdong (CN); Kai Xiao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 497 days.

(21) Appl. No.: 17/245,799

(22) Filed: Apr. 30, 2021

(65) Prior Publication Data
US 2021/0250927 A1    Aug. 12, 2021

Related U.S. Application Data

(63) Continuation of application No. PCT/CN2018/113615, filed on Nov. 2, 2018.

(51) Int. Cl.
*H04W 72/23* (2023.01)
*H04W 28/18* (2009.01)
*H04W 72/543* (2023.01)

(52) U.S. Cl.
CPC ......... *H04W 72/23* (2023.01); *H04W 72/543* (2023.01); *H04W 28/18* (2013.01)

(58) Field of Classification Search
CPC ...... H04W 72/23; H04W 72/20; H04L 1/0026

USPC .......................................................... 370/328
See application file for complete search history.

(56) References Cited

U.S. PATENT DOCUMENTS

| 11,758,559 | B2 * | 9/2023 | Park ..................... H04W 72/23 |
| | | | 370/328 |
| 2014/0348088 | A1 | 11/2014 | Yu et al. | |
| 2018/0279298 | A1 * | 9/2018 | Wang .................... H04L 1/0026 |
| 2021/0250927 | A1 * | 8/2021 | Liu ........................ H04W 72/23 |
| 2023/0308234 | A1 * | 9/2023 | Huang .................. H04L 5/0051 |
| 2023/0344585 | A1 * | 10/2023 | Liu ....................... H04L 5/0094 |
| 2023/0345465 | A1 * | 10/2023 | Fakoorian ............. H04W 72/20 |

(Continued)

FOREIGN PATENT DOCUMENTS

| CN | 108521674 A | 9/2008 |
| CN | 108738135 A | 11/2018 |

(Continued)

OTHER PUBLICATIONS

English translation of CN108521674A, Oct. 2023 (Year: 2023).*

*Primary Examiner* — William D Cumming
(74) *Attorney, Agent, or Firm* — Duane Morris LLP

(57) ABSTRACT

Methods, apparatuses and systems for indicating resources for uplink transmissions related to various services in a wireless communication. In one embodiment, a method performed by a wireless communication node includes: transmitting indication information to a first wireless communication device, wherein the indication information indicates to the first wireless communication device a resource set of resources configured for uplink transmissions related to at least one type of service by at least one second wireless communication device.

18 Claims, 18 Drawing Sheets

(56) References Cited

U.S. PATENT DOCUMENTS

| | | | | |
|---|---|---|---|---|
| 2023/0354362 A1* | 11/2023 | Xu | ................... | H04L 27/2605 |
| 2023/0388079 A1* | 11/2023 | Sun | ................... | H04L 5/0094 |
| 2023/0421309 A1* | 12/2023 | Stefanatos | ............ | H04L 1/1896 |

FOREIGN PATENT DOCUMENTS

| | | | | |
|---|---|---|---|---|
| WO | 2018157732 A1 | 9/2018 | | |
| WO | WO-2018175967 A1 * | 9/2018 | ............ | H04B 1/713 |
| WO | 2018184435 A1 | 10/2018 | | |

* cited by examiner

METHODS, APPARATUS AND SYSTEMS FOR INDICATING UPLINK TRANSMISSION RESOURCES RELATED TO VARIOUS SERVICES

TECHNICAL FIELD

The disclosure relates generally to wireless communications and, more particularly, to methods, apparatus and systems for indicating resources for uplink transmissions related to various services in a wireless communication.

BACKGROUND

The 4th Generation mobile communication technology (4G) Long-Term Evolution (LTE) or LTE-Advance (LTE-A) and the 5th Generation mobile communication technology (5G) face more and more demands. Based on the current development trend, 4G and 5G systems are developing supports on features of enhanced mobile broadband (eMBB), ultra-reliable low-latency communication (URLLC), and massive machine-type communication (mMTC).

In order to support the features of ultra-high reliability and ultra-low latency transmission, it is desirable to transmit low-delay and high-reliability services with a short transmission time. At the same time, the low-delay and high-reliability services can preempt at least part of resources of other services with a longer transmission time, when the other services have not yet been transmitted or are being transmitted. In order to reduce the performance impact on the low-delay and high-reliability services as much as possible, services with longer transmission time intervals or lower reliability need to be cancelled or stopped to avoid simultaneous transmissions with the low-delay and high-reliability services on the same resource. Currently, for the downlink service preemption transmission, 14 blocks are divided in the configured reference downlink resources and each block is indicated whether it is preempted based on a bitmap. However, there is no effective way to indicate uplink transmissions of various types of services.

In addition, uplink transmissions include two types: grant based uplink transmissions and grant free uplink transmissions. The grant based uplink transmission refers to uplink service transmission performed by a user equipment (UE) according to the uplink grant of the base station (BS), where the transmission resource is pre-determined. The grant free uplink transmission means the UE independently selects the uplink service transmission on a set of grant free resources that are semi-statically configured. For the grant free uplink transmission, the BS cannot predetermine which candidate resource the uplink transmission occurs on. Therefore, when the transmission resources of the grant free uplink transmission overlaps with the transmission resources of other low-priority users (preempted users), the base station cannot notify the preempted users in advance. A solution based on the preemption indication is no longer applicable. Various transmission types may coexist in a same carrier and different coexistence requirements need different resolution mechanisms, which causes a higher complexity to users.

Thus, existing systems and methods for indicating resources for uplink transmissions in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication node is disclosed. The method comprises: transmitting indication information to a first wireless communication device, wherein the indication information indicates to the first wireless communication device a resource set of resources configured for uplink transmissions related to at least one type of service by at least one second wireless communication device.

In another embodiment, a method performed by a first wireless communication device is disclosed. The method comprises: receiving indication information from a wireless communication node; and determining, based on the indication information, a resource set of resources configured for uplink transmissions related to at least one type of service by at least one second wireless communication device.

In a different embodiment, a wireless communication node configured to carry out a disclosed method in some embodiment is disclosed.

In yet another embodiment, a wireless communication device configured to carry out a disclosed method in some embodiment is disclosed.

In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
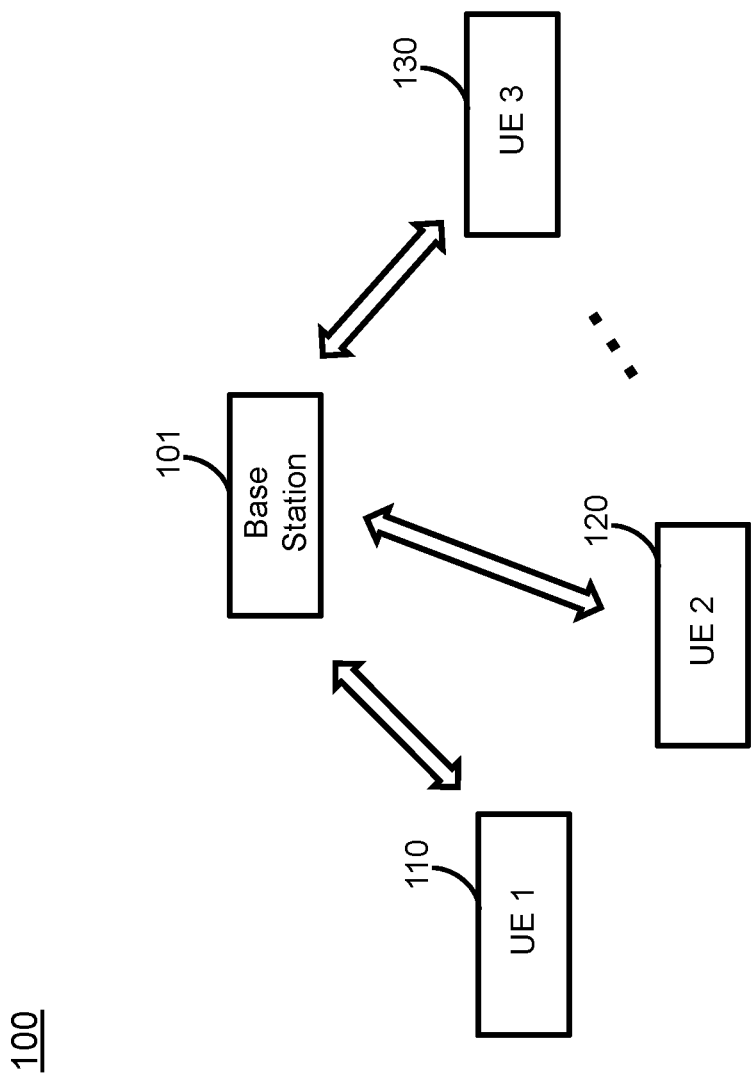
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS.

During the transmissions of uplink services with different transmission time intervals in a communication network, a service with a lower reliability requirement may be pre-empted by a service with a higher reliability requirement, and a service with a longer transmission time interval may be preempted by a service with a shorter transmission time interval. Since different UEs in the uplink transmissions are not aware of the preempted transmission, in order to reduce the performance impact on the services with high reliability and low latency, the present disclosure provides methods for indicating uplink transmission resources. A BS can send resource indication information to indicate resource allocation information of different types of services in different scenarios, thereby realizing unified instructions for different schemes in different scenarios. This realizes the coexistence of services with different priorities, e.g. the URLLC services and the eMBB services. With the methods provided by the present disclosure, indications can be effectively implemented for a multiplexing of different services, e.g. the eMBB uplink services and the URLLC uplink services, which improves the resource efficiency when different services are multiplexed.

In one embodiment, the resources indicated by the resource indication information may include one or more of the following: a resource set allocated to a first type of service in a certain period of time, e.g. in a reference uplink resource (RUR); a set of resources allocated to a second type of service; a set of overlapping resources allocated to both the first type of service and the second type of service within a certain period of time. For example, the first type of service refers to a URLLC service; and the second type of service refers to an eMBB service. The resource indication information may be transmitted through downlink control information carried on a physical downlink control channel (PDCCH). The allocated resource may be a resource indicated by the uplink grant information in the downlink control information, a resource indicated by a radio resource control (RRC) signaling, or a resource indicated by a demodulation reference signal (DMRS) of a PDCCH.

In one embodiment, one or more common radio network temporary identifiers (RNTIs) are defined, and a cyclic redundancy check (CRC) of the resource indication information is scrambled by the common RNTI. The common RNTI refers to a RNTI pre-defined in a protocol and shared by one or more or all UEs. When the indicated resource overlaps with an uplink transmission resource allocated to the terminal or UE, the UE can adjust the uplink transmission according to at least one of the following policies: stopping the designated uplink transmission; canceling the entire uplink transmission; performing uplink transmission based on a rate matching with respect to the overlapping resource; performing uplink transmission with a decreased power on at least part of the allocated resources; performing uplink transmission with an increased power on at least part of the allocated resources; performing uplink transmission based on a different resource that has no overlap with the indicated resource; performing the uplink transmission based on a puncture scheme; performing the uplink transmission on a backup resource.

In one embodiment, the resource indication information includes a policy indication field used to indicate which operation is performed after the terminal receives the resource indication information. The resource indication information may further include a backup resource indication domain for indicating a backup resource for an allocated resource. The resource indication information may further include indication information for determining an amount of power increase or decrease during an uplink transmission modification. In one embodiment, a group of grant free resources is defined with a resource occupation priority sequence for the grant free resources. The resource indication information indicates resource occupation status of multiple grant free resources in the grant free resource group.

In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. A UE, e.g. UE 1 110, may be scheduled for an uplink transmission from the UE to the BS 101. That is, a resource region is reserved or allocated for the uplink transmission to be executed at a later time for a first service type. The uplink transmission may be a data transmission based on at least one of: a physical uplink shared channel (PUSCH); a physical uplink control channel (PUCCH); and a sounding reference signal (SRS). Before the uplink transmission for the first service type is executed or during the uplink transmission, the BS 101 may schedule an uplink transmission for a second service type on a resource region that conflicts with or at least partially overlaps with the reserved resource region. In this case, the UE receives indication information, e.g. from the BS 101. The indication information indicates a resource set of all resources configured for uplink transmissions related to the second service type by at least one other UE. Then the UE may modify the uplink transmission based on the indication information.

Figure 2:
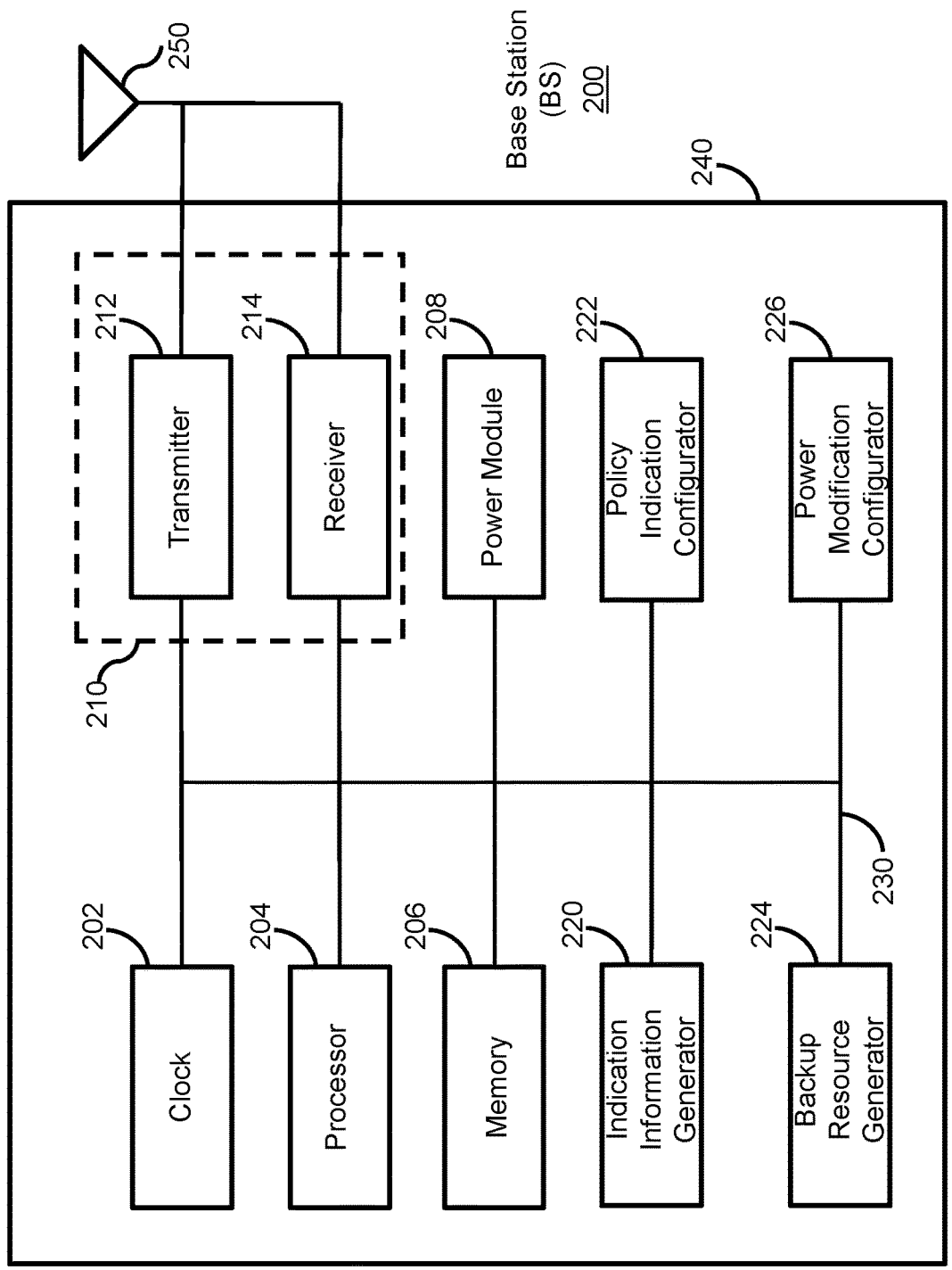
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, an indication information generator 220, a policy indication configurator 222, a backup resource generator 224, and a power modification configurator 226.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., the BS or another UE). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the BS 200 may schedule uplink transmissions from terminals or UEs to the BS 200. For example, the indication information generator 220 may generate and transmit, via the transmitter 212, indication information to a first UE. The indication information indicates to the first UE a resource set of all resources configured for uplink data transmissions related to at least one type of service by at least one second UE. Different types of services may have different priority levels. In one embodiment, the resource set comprises at least one of: a first resource set of all resources configured for uplink data transmissions related to a first type of service within a given time period; a second resource set of all resources configured for uplink data transmissions related to a second type of service that has a lower priority than the first type of service within the given time period; and a third resource set that is an intersection of the first resource set and the second resource set. In one example, the first type of service includes ultra-reliable low-latency communication (URLLC) services; and the second type of service includes enhanced mobile broadband (eMBB) services. In another embodiment, the resource set comprises: a first resource set of all resources configured for uplink data transmissions related to a first type of service within a first time period; and a second resource set of all resources configured for uplink data transmissions related to a second type of service within a second time period. The indication information may be transmitted through at least one of: a downlink control information (DCI) on a physical downlink control channel (PDCCH); a radio resource control (RRC) signaling; and a demodulation reference signal (DMRS) of a PDCCH.

In one embodiment, the policy indication configurator 222 can configure policy indication information for the first UE. The policy indication information indicates how to modify an uplink transmission of the first UE in response to an overlap between the resource set and a first resource assigned to the first UE for the uplink transmission. The uplink transmission is related to a type of service different from the at least one type of service. The policy indication configurator 222 may transmit, via the transmitter 212, policy indication information to the first UE directly, or send the policy indication information to the indication information generator 220 for transmitting to the first UE as part of the indication information generated by the indication information generator 220.

According to various embodiments, the policy indication information may be carried by at least one of: a fixed bit field in the indication information; a demodulation reference signal (DMRS) of a physical downlink control channel (PDCCH); a radio resource control (RRC) signaling to the first UE; and a radio network temporary identifier (RNTI) scrambling cyclic redundancy check (CRC) of the indication information. The RNTI is associated with a group of UEs or shared by all UEs associated with the BS 200. In one embodiment, the policy indication information indicates the first UE to modify the uplink transmission by at least one of: stopping the uplink transmission at an overlapping resource between the resource set and the first resource; cancelling the uplink transmission as an entirety; performing the uplink transmission based on a rate matching scheme; performing the uplink transmission with a decreased transmission power on at least part of the first resource; performing the uplink transmission with an increased transmission power on at least part of the first resource; and performing the uplink transmission on a second resource that has no overlap with the resource set. The first resource and the second resource may belong to a resource group assigned to the first UE for the uplink transmission. Each resource in the resource group has a priority level. The second resource has a highest priority level among resources in the resource group that have no overlap with the resource set.

The backup resource generator 224 in this example may generate a backup resource for the first resource assigned to the first UE for the uplink transmission. The backup resource generator 224 may either transmit an indication of the backup resource to the first UE directly, or send the backup resource information to the indication information generator 220 for transmitting the indication information that indicates, in response to an overlap between the resource set and the first resource, the backup resource for the first resource.

The power modification configurator 226 in this example may configure a power modification parameter for the first UE to modify its transmission power of the uplink transmission, in response to an overlap between the resource set and the first resource. The power modification configurator 226 may either transmit an indication of the power modification parameter to the first UE directly, or send the power modification parameter to the indication information generator 220 for transmitting the indication information that indicates, in response to an overlap between the resource set and the first resource, the power modification parameter for the first UE to increase or decrease its transmission power of the uplink transmission.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the indication information generator 220. Conversely, each of the modules illustrated in FIG. 2 can be implemented using a plurality of separate components or elements.

Figure 3:
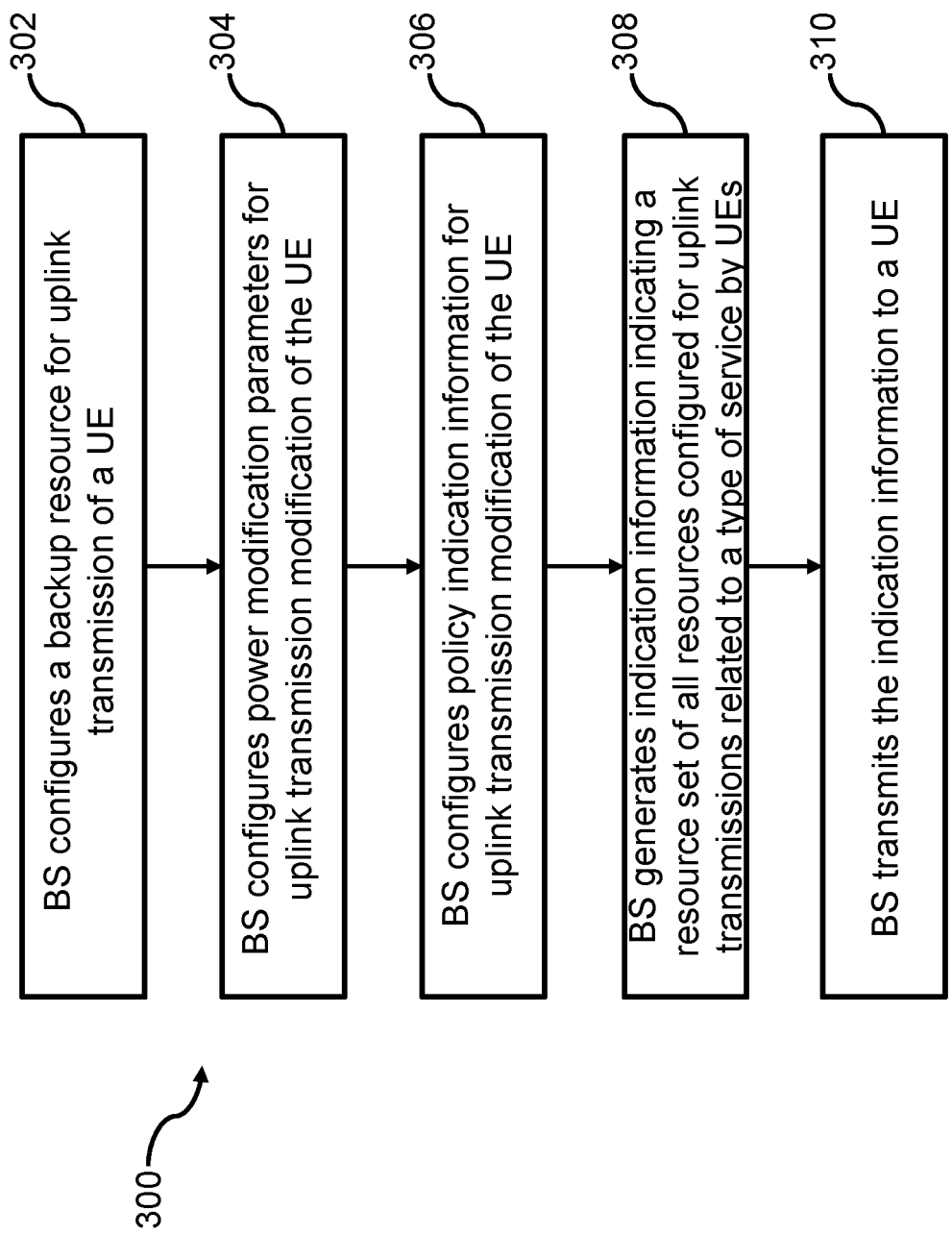
FIG. 3 illustrates a flow chart for a method performed by a BS for indicating uplink transmission resources related to various services, in accordance with some embodiments of the present disclosure.

FIG. 3 illustrates a flow chart for a method 300 performed by a BS, e.g. the BS 200 in FIG. 2, for indicating uplink transmission resources related to various services, in accordance with some embodiments of the present disclosure. At operation 302, the BS configures a backup resource for uplink transmission of a UE. At operation 304, the BS configures power modification parameters for uplink transmission modification of the UE. At operation 306, the BS configures policy indication information for uplink transmission modification of the UE. At operation 308, the BS generates indication information indicating a resource set of all resources configured for uplink transmissions related to a type of service by UEs. At operation 310, the BS transmits the indication information to a UE.

Figure 4:
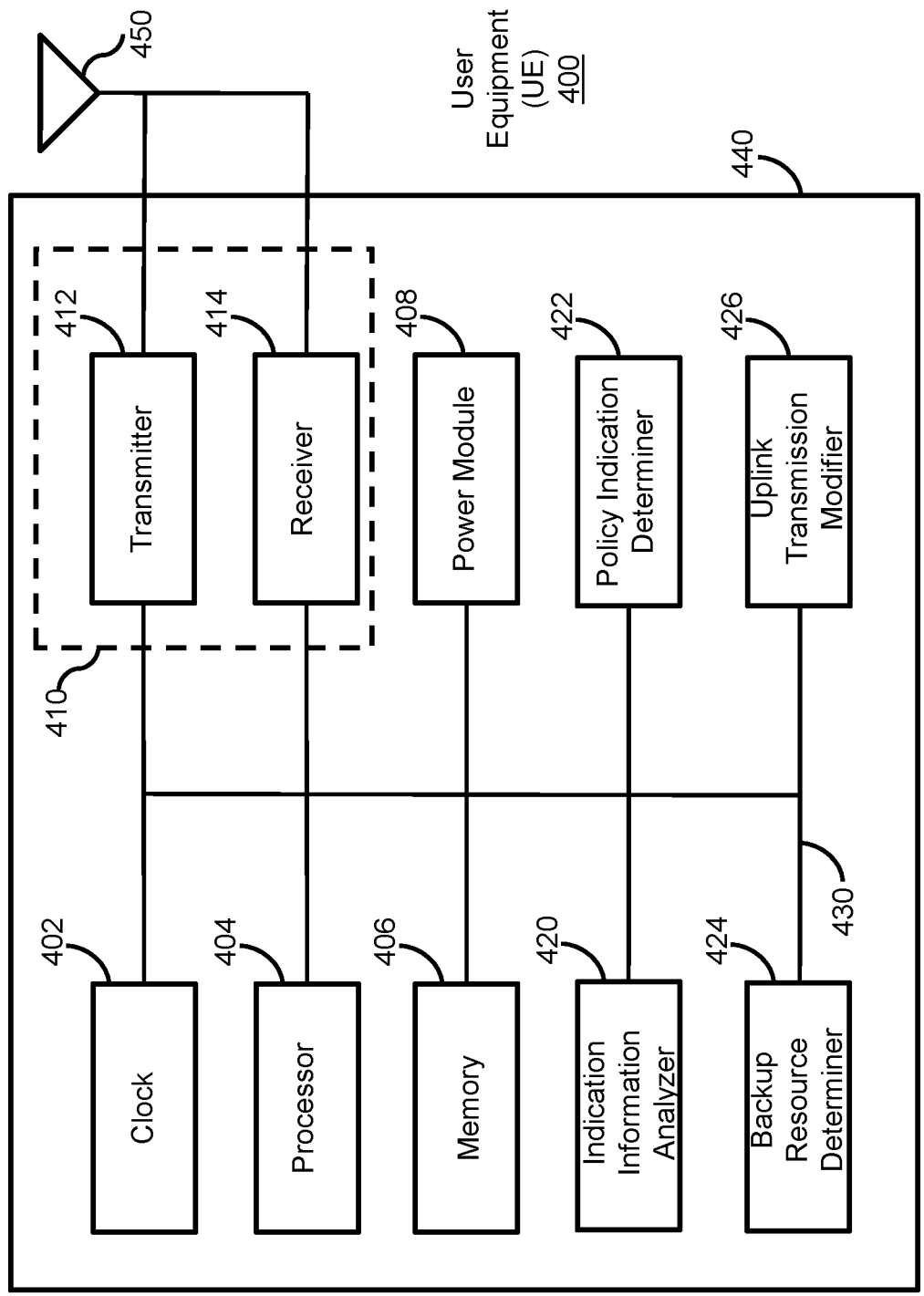
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, an indication information analyzer 420, a policy indication determiner 422, a backup resource determiner 424, and an uplink transmission modifier 426.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

The indication information analyzer 420 in this example may receive, via the receiver 414, indication information from a BS. The indication information analyzer 420 may analyze the indication information to determine, based on the indication information, a resource set of all resources configured for uplink data transmissions related to at least one type of service by at least one other UE. In one embodiment, the resource set comprises at least one of: a first resource set of all resources configured for uplink data transmissions related to a first type of service within a given time period; a second resource set of all resources configured for uplink data transmissions related to a second type of service, which has a lower priority than the first type of service, within the given time period; and a third resource set that is an intersection of the first resource set and the second resource set. In one example, the first type of service includes URLLC services; and the second type of service includes eMBB services. In another embodiment, the resource set comprises: a first resource set of all resources configured for uplink data transmissions related to a first type of service within a first time period; and a second resource set of all resources configured for uplink data transmissions related to a second type of service within a second time period. The indication information may be received through at least one of: a downlink control information (DCI) on a physical downlink control channel (PDCCH) from the BS; a demodulation reference signal (DMRS) of a PDCCH from the BS; and a radio resource control (RRC) signaling from the BS.

The policy indication determiner 422 in this example may obtain and determine policy indication information from the BS. The policy indication determiner 422 may obtain the policy indication information through at least one of: a fixed bit field in the indication information; a demodulation reference signal (DMRS) of a physical downlink control channel (PDCCH); a radio resource control (RRC) signaling from the BS; and a radio network temporary identifier (RNTI) scrambling cyclic redundancy check (CRC) of the indication information. The RNTI is associated with a group of UEs or shared by all UEs associated with the BS. The policy indication determiner 422 may send the obtained policy indication information to the uplink transmission modifier 426 for uplink transmission modification.

The uplink transmission modifier 426 in this example may modify, based on the policy indication information, an uplink transmission of the UE 400 in response to an overlap between the resource set and a first resource assigned to the UE 400 for the uplink transmission. The uplink transmission is related to a type of service different from the at least one type of service.

According to various embodiments, the uplink transmission modifier 426 may modify the uplink transmission by at least one of: stopping the uplink transmission at an overlapping resource between the resource set and the first resource; cancelling the uplink transmission as an entirety; performing the uplink transmission based on a rate matching scheme; performing the uplink transmission with a decreased transmission power on at least part of the first resource; performing the uplink transmission with an increased transmission power on at least part of the first resource; and performing the uplink transmission on a second resource that has no overlap with the resource set. In one example, the first resource and the second resource belong to a resource group assigned to the UE 400 for the uplink transmission. Each resource in the resource group has a priority level, while the second resource has a highest priority level among resources in the resource group that have no overlap with the resource set. In one embodiment, the indication information further indicates a power modification parameter based on which the uplink transmission modifier 426 may modify its transmission power of the uplink transmission in response to an overlap between the resource set and the first resource.

The backup resource determiner 424 in this example may determine a backup resource for the first resource assigned to the UE 400 for the uplink transmission. The backup resource determiner 424 may either receive an indication of the backup resource to from the BS directly, or obtain the backup resource information from the indication information analyzer 420 based on an analysis of the indication information by the indication information analyzer 420.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the indication information analyzer 420. Conversely, each of the modules illustrated in FIG. 4 can be implemented using a plurality of separate components or elements.

Figure 5:
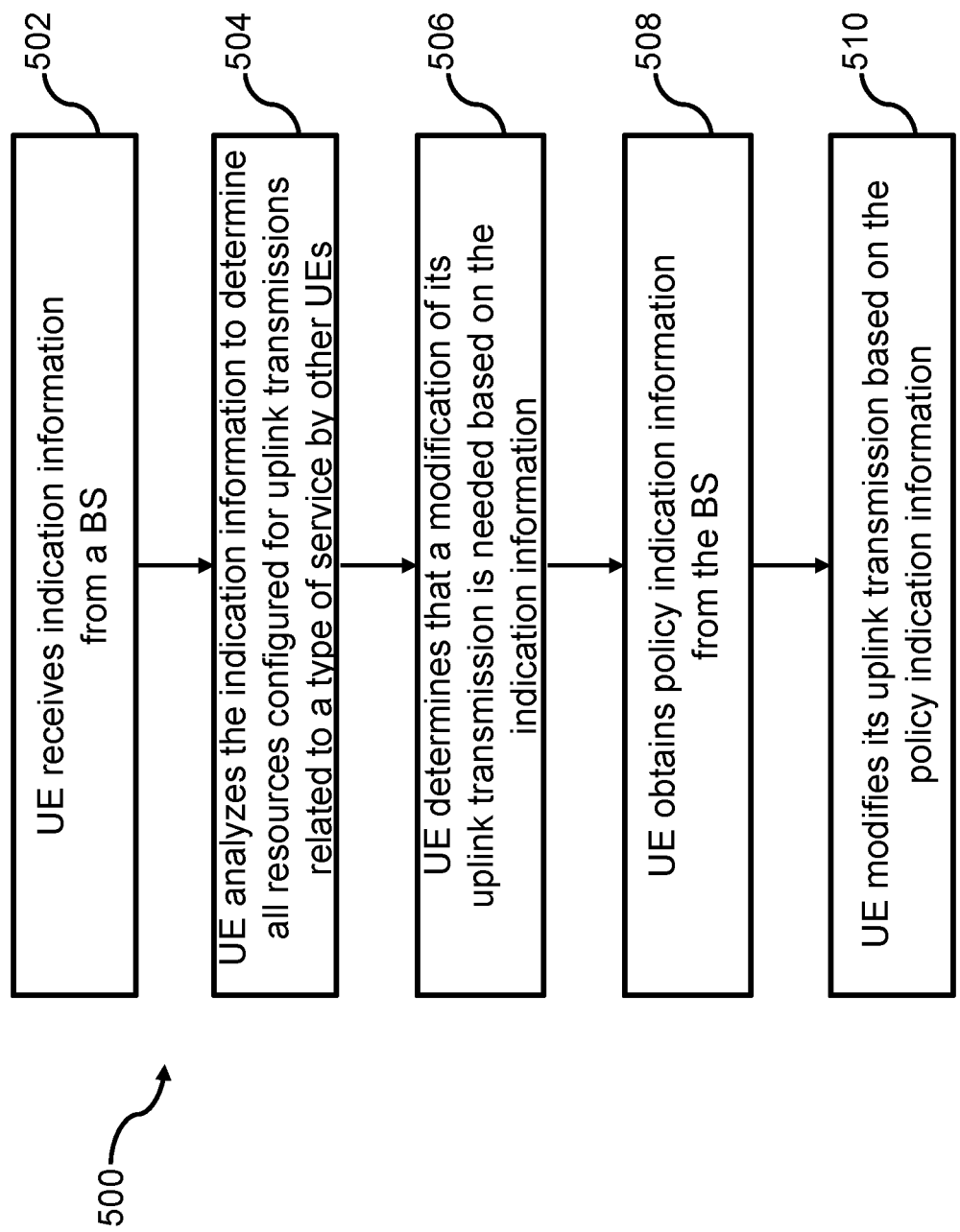
FIG. 5 illustrates a flow chart for a method performed by a UE for determining uplink transmission resources related to various services, in accordance with some embodiments of the present disclosure.

FIG. 5 illustrates a flow chart for a method 500 performed by a UE, e.g. the UE 400 in FIG. 4, for determining uplink transmission resources related to various services, in accordance with some embodiments of the present disclosure. At operation 502, the UE receives indication information from a BS. At operation 504, the UE analyzes the indication information to determine all resources configured for uplink transmissions related to a type of service by other UEs. At operation 506, the UE determines that a modification of its uplink transmission is needed based on the indication information. At operation 508, the UE obtains policy indication information from the BS. At operation 510, the UE modifies its uplink transmission based on the policy indication information.

Different embodiments of the present disclosure will now be described in detail hereinafter. It is noted that the features of the embodiments and examples in the present disclosure may be combined with each other in any manner without conflict.

According to various embodiments of the present disclosure, a BS sends resource indication information to indicate a resource set of all resources configured for uplink transmissions related to at least one type of service by all possible UEs associated with the BS.

In the following embodiments, overlaps between the URLLC uplink transmissions and the eMBB uplink transmissions are taken as examples. The URLLC uplink transmissions have higher reliability and lower delay requirements. As such, the present disclosure provides a related strategy for ensuring the URLLC uplink transmission performance as much as possible. But the described solution is not limited to the two types of services, and is applicable between any other two or more services having a priority relationship.

In a first embodiment, a method is disclosed for indicating resource occupancy by resource indication information, and for generating and transmitting the resource indication. The base station sends the resource indication information in a broadcast manner. For example, the resource indication information is downlink control information carried on a physical downlink control channel, and the CRC of the resource indication information is scrambled by a public or common RNTI. The common RNTI may be a RNTI pre-defined in the protocol, or an RNTI configured by the base station to all terminals through system information, so that all terminals can utilize the known RNTI to descramble the resource indication information on time-frequency resources used for transmitting the resource indication information. The time-frequency resource of the resource indication information may be jointly indicated to the terminal by the search space configuration and the control resource set configuration.

Figure 6:
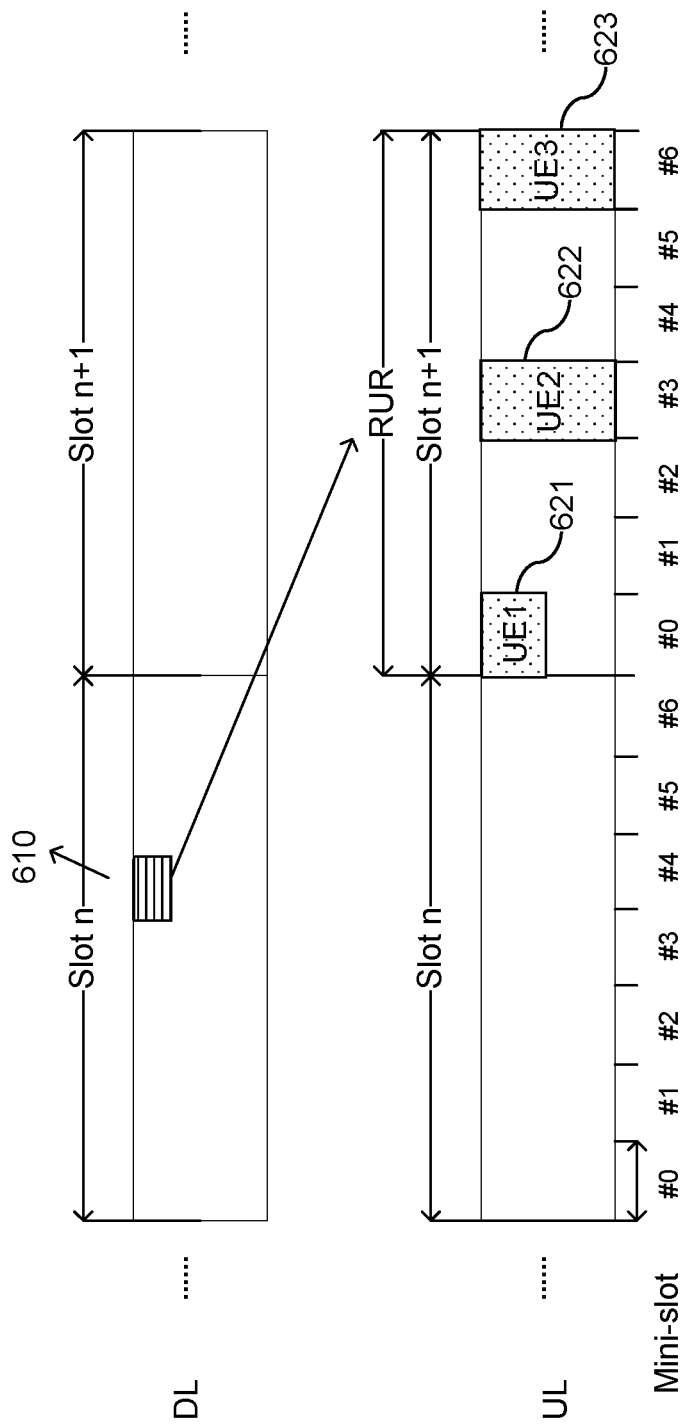
FIG. 6 illustrates an exemplary method for indicating uplink transmission resources related to a type of service, in accordance with an embodiment of the present disclosure.

The resource indication information is preferably indicated in the configured reference uplink resource (RUR) region, indicating resource usage in the RUR region or the sub-regions divided in the RUR according to a certain granularity. The frequency domain region corresponding to the uplink resource region is the activated uplink (UL) bandwidth part (BWP) of the terminal; and the corresponding time domain region is the region after the start or end symbol of the control resource set where the current pre-emption indication information is located. The offset value and the length value are pre-determined, pre-defined, or configured by high-level signaling. The resource indication information indicates resource occupancy information, by e.g. the following three manners:

In a first manner, the resource indication information indicates the resources allocated to a certain type of service. In this embodiment, the following two service types are distinguished: URLLC and eMBB. In this manner, the resource indication information may indicate all resources allocated to the URLLC uplink transmission in the reference uplink resource region. As shown in FIG. 6, the reference uplink resource region corresponding to the resource indication information 610 transmitted in the slot n is slot n+1. This corresponding relationship and the time domain length of the RUR are predefined or pre-configured by RRC signaling, or indicated in the resource indication information. The correspondence here is merely for example and is not exclusive. The URLLC uplink service is transmitted by a mini-slot of 2 or 4 or 7 symbols. FIG. 6 shows a 2-symbol mini-slot. The URLLC uplink scheduling interval is k1 mini-slots or symbols. The symbol may be an OFDM symbol or a single-carrier frequency-division multiple access (SC-FDMA) symbol. That is, the time interval between the uplink grant and the uplink transmission is k1, wherein k1 is an integer greater than or equal to zero. K1 needs to be greater than the sum of the URLLC decoding uplink grant information, the timing advance (TA), and the length of time required to prepare the uplink transmission data. Therefore, preferably, the minimum value of k1 is set between the end symbol of the resource indication information and the end symbol of the corresponding RUR. Then, after the resource indication information, there will be no more newly allocated URLLC uplink transmission in the RUR.

Figure 7:
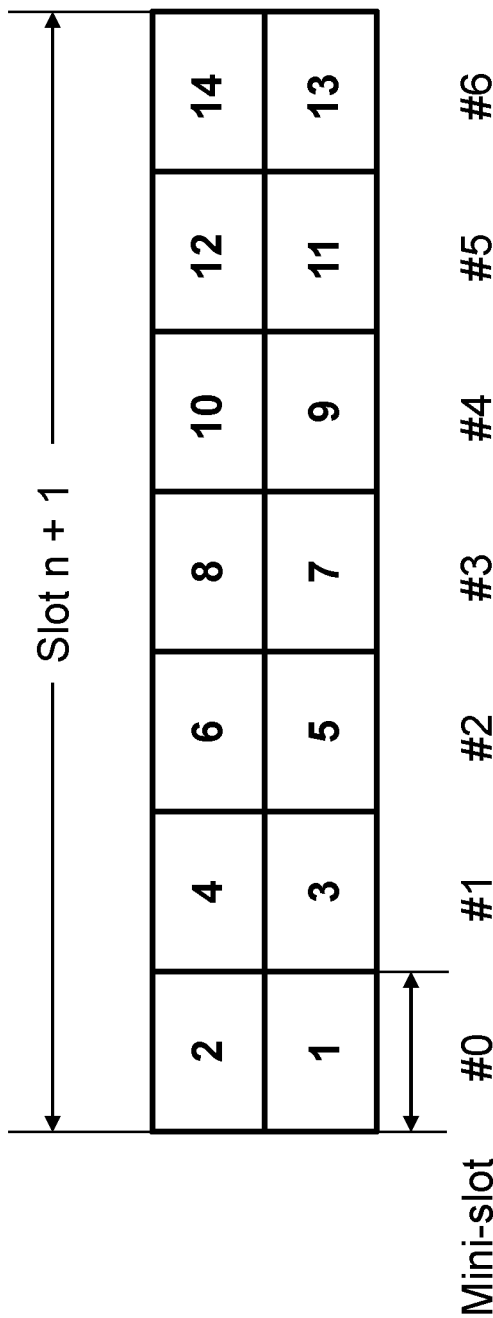
FIG. 7 illustrates exemplary resource blocks for the uplink transmissions, in accordance with an embodiment of the present disclosure.

For the resource occupancy indication in the RUR, multiple URLLC uplink transmissions may occupy different symbols and frequency resources. Here, the RUR is divided into 7*2 sub-resource blocks. That is, the frequency domain is divided into upper and lower sub-bands; and the time domain is divided into seven mini-slots. A 14-bit bitmap is used to indicate whether the 14 sub-resource blocks have URLLC uplink transmissions respectively. For example, the indication sequence is predefined as "first frequency domain, then time domain." That is, as shown in FIG. 7, the top first bit, bit 1, indicates the occupancy of the sub-resource blocks corresponding to the low RB in mini-slot #0. Then the resource occupancy of each sub-resource block is sequentially indicated in the order from 1 to 14 as shown in FIG. 7. For example, there are three URLLC uplink transmissions 621, 622, 623 in slot n+1 as shown in FIG. 6. The corresponding resource occupancy indication is: 01000011000011.

In this manner of resource indication, the UE that is configured to transmit the eMBB service adjusts the transmission policy of the eMBB according to the foregoing URLLC resource indication. For example, if there is an overlap between the indicated resource and the allocated resource, at least one of the following policies may be adopted: stopping the allocated uplink transmission; canceling the entire uplink transmission; performing uplink transmission based on a rate matching with respect to the overlapping resource; performing uplink transmission with a reduced power on part or all of the allocated resources; performing uplink transmission on a switched resource. The above strategies and policies will be specifically described in the following embodiments.

Figure 8:
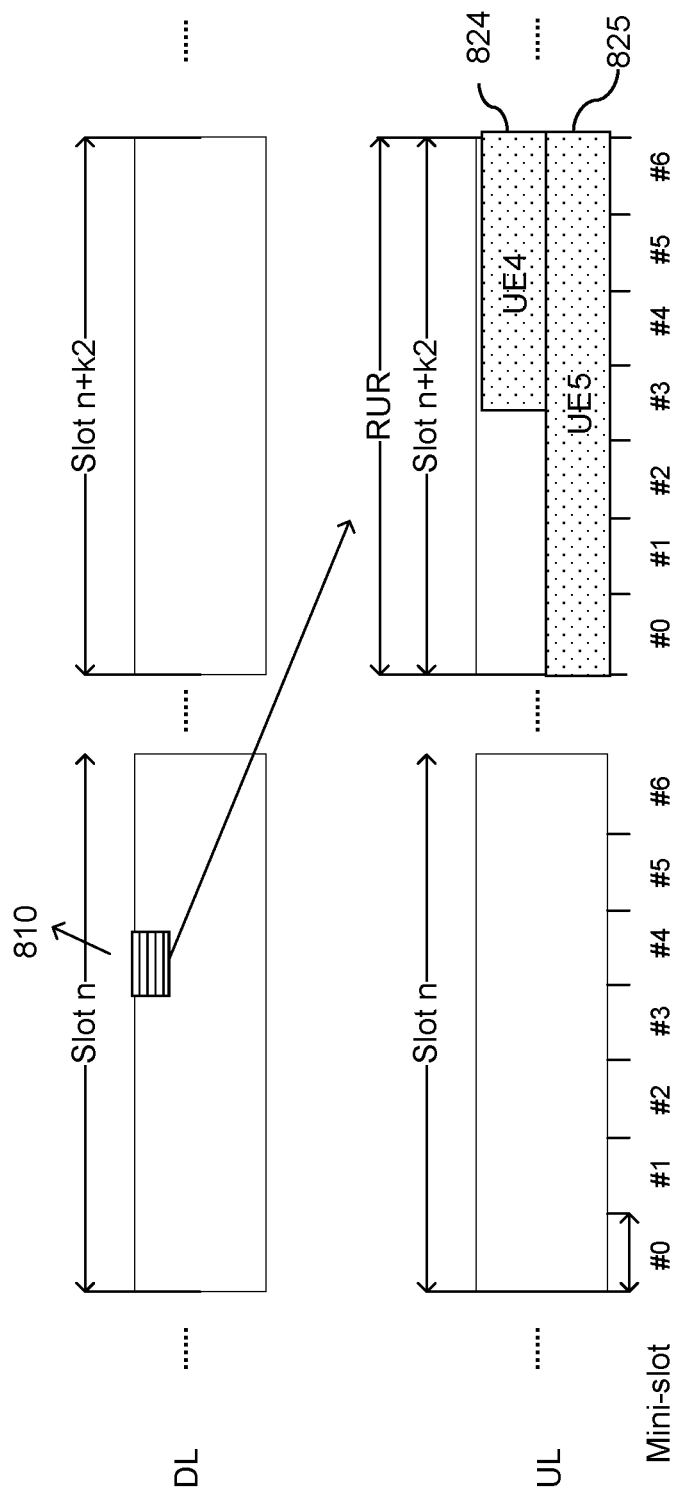
FIG. 8 illustrates an exemplary method for indicating uplink transmission resources related to another type of service, in accordance with an embodiment of the present disclosure.

In this first manner, the resource indication information may also be used to indicate all resources allocated to the eMBB uplink transmission in the reference uplink resource region. As shown in FIG. 8, the reference uplink resource region corresponding to the resource indication information 810 transmitted in the slot n is slot n+1. The foregoing relationship and the time domain length of the RUR are predefined or pre-configured by RRC signaling, or indicated in the resource indication information. The correspondence here is merely an example and is not exclusive. The eMBB uplink scheduling interval is k2 slots, wherein k2 is an integer greater than or equal to 0. That is, there is a time interval k2 between the uplink grant and the uplink transmission of the eMBB service. The k2 needs to be greater than the sum of the eMBB decoding uplink grant information, the timing advance (TA), and the durations required to prepare the uplink transmission data. Therefore, preferably, the minimum value of k2 is set between the end symbol of the resource indication information and the end symbol of the corresponding RUR. After the resource indication information, there will be no newly allocated eMBB uplink transmission in the RUR. The specific indication manner may also be the same as the indication manner of the URLLC occupation resource described above. The resource occupation 824, 825 shown in FIG. 8 may be referred to as: 10101011111111. In this example, for the sub-resource block corresponding to the high RB of the mini-slot #3, the eMBB service of the UE4 occupies only a part of the resource block. Since the indication granularity defined here is a pre-divided sub-resource block, as long as a part of the sub-resource block is occupied, it is necessary to indicate that the status of the sub-resource block to be occupied, where the corresponding bit is set to 1.

In this manner, the UE that is configured to transmit the URLLC service adjusts the transmission policy of the URLLC according to the foregoing eMBB resource indication. For example, if the allocated URLLC uplink transmission resource overlaps with the indicated eMBB resource, at least one of the following policies may be adopted: performing uplink transmission based on a rate matching with respect to overlapping resource; performing uplink transmission with a boosted power on part or all of the allocated resources; and performing uplink transmission on a switched resource. The above policies will be specifically described in the following embodiments.

In a second manner, the resource indication information indicates overlapping resources of two types of services. In contrast to the first manner, the resource indication information of the second manner indicates the overlapping resources of the two types of services. For example, the resource occupancy of the URLLC service in a certain slot is shown in FIG. 6, while the resource occupancy of the eMBB service in the same slot is shown in FIG. 8. Then for the resources overlapping between the two types of services, can still be described following the above mentioned reference manner. Here, the indication information is: 00000011000011, for the overlapping resources. In this case, a UE transmitting any type of service can determine whether to adjust the transmission policy of the service to be transmitted according to the relevant indication information. For example, the UE2 identifies that the URLLC uplink transmission resource that is allocated to the UE2 includes the overlapping resource indicated in the resource indication information, and may transmit using a strategy of improving transmission reliability, such as improving transmission power. On the other hand, the UE4 recognizes that its allocated eMBB uplink transmission resource includes the overlapping resource indicated in the resource indication information, and may adopt a certain avoidance policy (such as canceling the transmission) to avoid its impact on the URLLC service.

In the above manner, a more reliable URLLC service transmission can be ensured. That is, even if the UE transmitting a certain type of service misses the resource indication information and does not adjust the transmission policy accordingly, and the UE transmitting another type of service successfully detects the resource indication information, the reliability of the URLLC service transmission can still be ensured to a certain extent. Certainly, in this manner, it may be explicitly indicated in the resource indication information that the transmission policy of which type of service is to be adjusted. For example, a bit may be used for the indication. When the bit is set to 1, it indicates that only the transmission strategy of the eMBB is to be adjusted; when this bit is set to 0, it means that only the URLLC transmission policy is to be adjusted. The related indication can also be semi-statically indicated by RRC signaling.

Figure 9:
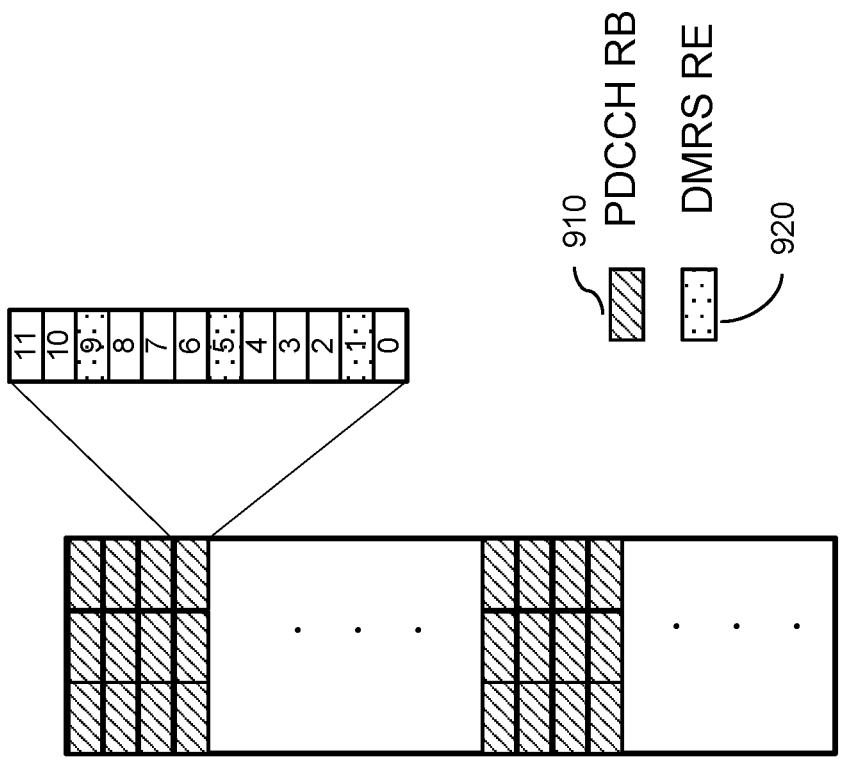
FIG. 9 illustrates an exemplary method for carrying indication information, in accordance with an embodiment of the present disclosure.

In a third manner, the resource indication information is downlink control information carried in the PDCCH, and the resource indication information may also be jointly indicated by a sequence and downlink control information (DCI). Specifically, the sequence may be a demodulation reference signal (DMRS) of a PDCCH that carries the downlink control information. In this case, the PDCCH DMRS sequence and the DCI jointly indicate resource indication information. For example, as shown in FIG. 9, the shaded block 910 is a resource block (RB) mapped by the PDCCH. The PDCCH time domain is mapped on N symbols (e.g., 3 symbols), and each symbol in the frequency domain is mapped to M RBs (e.g., 16 RBs), for a total of 48 RBs. The PDCCH DMRS is mapped at a certain density in a part or all of the PDCCH RBs. The DMRS density shown in FIG. 9 is ¼, where 3 of 12 resource elements (REs) in an RB are REs 920 occupied by DMRS. Specifically, they are mapped on REs 1, 5, and 9.

It is assumed here that DMRSs on all PDCCH RBs are mapped according to the above density. The number of DMRS REs is 48*3=144 REs. The DMRS sequence is mapped to the DMRS RE. For example, defining a DMRS sequence whose length is equal to the number of DMRS REs, the DMRS sequence elements are sequentially mapped on the DMRS RE in the order of "first time domain, then frequency domain." That is, the lowest DMRS RE of the lowest PDCCH RB of the first PDCCH symbol is first mapped. Then it is sequentially mapped to the high frequency direction of the first PDCCH symbol. After all DMRS REs of the first PDCCH symbol are mapped, the second PDCCH symbol continues to be mapped, also in order of from low frequency to high frequency. The subsequent PDCCH symbols are mapped so on and so forth. The DMRS sequence may be a sequence of a specific length that is truncated from a longer sequence, or may be a sequence that is directly generated at a specific length. The length of the DMRS sequence is not limited to be equal to the number of DMRS REs. For example, the length of the DMRS sequence may also be smaller than the number of DMRS REs, and the information mapped to the DMRS RE is obtained by repeating the DMRS sequence elements or encoding DMRS by other means.

For example, as shown in Table 1, the complete resource indication information includes 6 bits. Each bit is used to indicate the occupancy of the corresponding sub-resource block. The highest 2 bits (e.g. the two most significant bits) use the PDCCH DMRS sequence to implicitly indicate four defined DMRS sequences, such as S1, S2, S3, S4. The lower 4 bits are carried in the PDCCH payload.

TABLE 1

| PDCCH DMRS Sequence | 2 most significant bits (2MSB) |
| --- | --- |
| S1 | 00 |
| S2 | 01 |
| S3 | 10 |
| S4 | 11 |

In some other embodiment, the transmission policy information can also be carried by at least one of: different mapping locations of DMRS REs within a RB; DMRS sequence mapping order; orthogonal cover code scrambled on PDCCH DMRS sequence. According to the policy indication information carried by different mapping locations of DMRS REs within a RB, multiple groups of mapping locations of DMRS RE within a RB can be defined. For example, the following four location groups have been defined: RE{0, 4, 8}, RE{1, 5, 9}, RE{2, 6, 10}, RE{3, 7, 11}. The relationship between location groups and values of corresponding bit field is defined as the following Table 2. By mapping DMRS sequence into different REs, the BS can indicate corresponding indication information.

TABLE 2

| mapping location of DMRS REs within a RB | 2 most significant bits (2MSB) |
| --- | --- |
| RE{0, 4, 8} | 00 |
| RE{1, 5, 9} | 01 |
| RE{2, 6, 10} | 10 |
| RE{3, 7, 11}. | 11 |

Similarly, different DMRS sequence mapping orders can be defined, e.g. from lower frequency to higher frequency; from higher frequency to lower frequency, etc. Each DMRS sequence mapping order corresponding to a certain value of corresponding bit field. Then the indication information can be carried by DMRS sequence mapping orders. Different orthogonal cover codes scrambled on PDCCH DMRS sequence can also be defined for carrying indication information in the same way.

Figure 10:
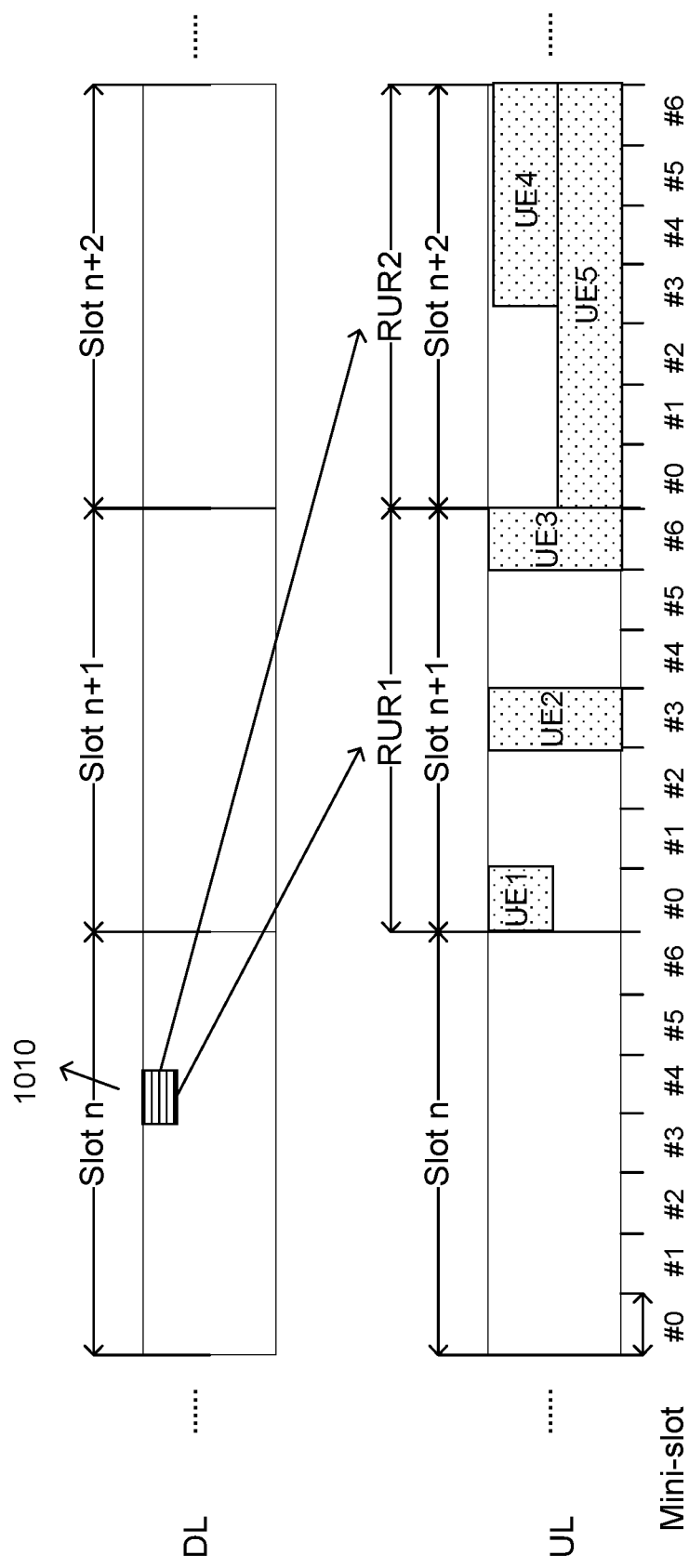
FIG. 10 illustrates an exemplary method for indicating uplink transmission resources related to multiple services, in accordance with an embodiment of the present disclosure.

In a second embodiment, another method is disclosed for indicating resource occupancy by resource indication information. As described in the first embodiment, when the resource indication information is used to indicate the URLLC resource occupation, the time domain location relationship between the resource indication information and the RUR may be different from the time domain location relationship when the resource indication information is used to indicate the eMBB resource occupation. This is because the two types of services have different uplink scheduling timing requirements. As shown in FIG. 10, the system pre-defines or pre-configures through RRC signaling that, for the indications of resource occupation for uplink transmissions of different services, their location relationships between the location of the resource indication information and the RUR are different. Specifically, since the URLLC uplink scheduling timing is shorter, when the resource indication information indicates the URLLC resource occupation status, the resource indication information 1010 on the slot n indicates the occupancy status on the slot n+1; and for the indication of the eMBB uplink transmission resource, the resource indication information 1010 on the slot n indicates the occupancy status on the slot n+2.

The adjustment strategy for uplink transmissions in slot n+1 and slot n+2 on the network side may be different. For example, on slot n+1, the grant based URLLC uplink service is transmitted. At this time, the network side wants to indicate the resource occupied by the URLLC to the UE transmitting the eMBB, and request it to adjust the uplink transmission policy of the eMBB. In this case, the resource indication information 1010 of the slot n indicates the resource occupied by the URLLC uplink transmission on the slot n+1. In contrast, the slot n+2 is configured with the grant free URLLC uplink service. Then, the network side does not know the actual resource usage of the URLLC. Therefore, the adjustment policy adopted is to indicate the resources occupied by the eMBB, and request the URLLC UE to adjust the uplink transmission policy of the URLLC. In this case, the resource indication information 1010 in the slot n indicates the resources occupied by the eMBB uplink transmission on slot n+2.

As such, the same resource indication information includes different resource indications in the two RURs. In this case, it can be pre-defined that when the transmission resource of whichever type of service is first indicated, the high bit of the resource transmission information is occupied by the type of service, while the other type of service occupies the low bit. For example, the system pre-defines the high 14 bits to indicate the resources occupied by the URLLC; and the next 14 bits are used to indicate the resources occupied by the eMBB. According to the indication manner in the first embodiment, the corresponding bit of the resource indication information is set to: 01000011000011 10101011111111. In addition, in order to support the indication manner, the resource indication information may also include a defined bit at a fixed location for indicating whether the current resource indication information includes indication information of two RURs. For example, if the fixed highest bit position is 1, the current resource indication information includes indication information of two RURs; if the highest bit position is 0, it indicates that the current resource indication information includes one RUR indication information, i.e., it only indicates the resource occupancy of a certain type of service in the RUR for the service.

In a third embodiment, it is described that under the first manner of the first embodiment, how the UE can distinguish that the resource occupancy of which type of service is indicated by the current resource indication information, and/or how the UE determines which type of service transmission policy needs to be adjusted. In a first example, the UE determines, according to the overlapping status between the resources allocated to the UE and the resources indicated by the resource indication information, the resource occupancy of which type of service is indicated by the current resource indication information. Correspondingly, if the UE is scheduled with a transmission for another type of service on a resource that overlaps with the indicated resource, the transmission strategy of the scheduled service transmission needs to be adjusted.

Figure 11:
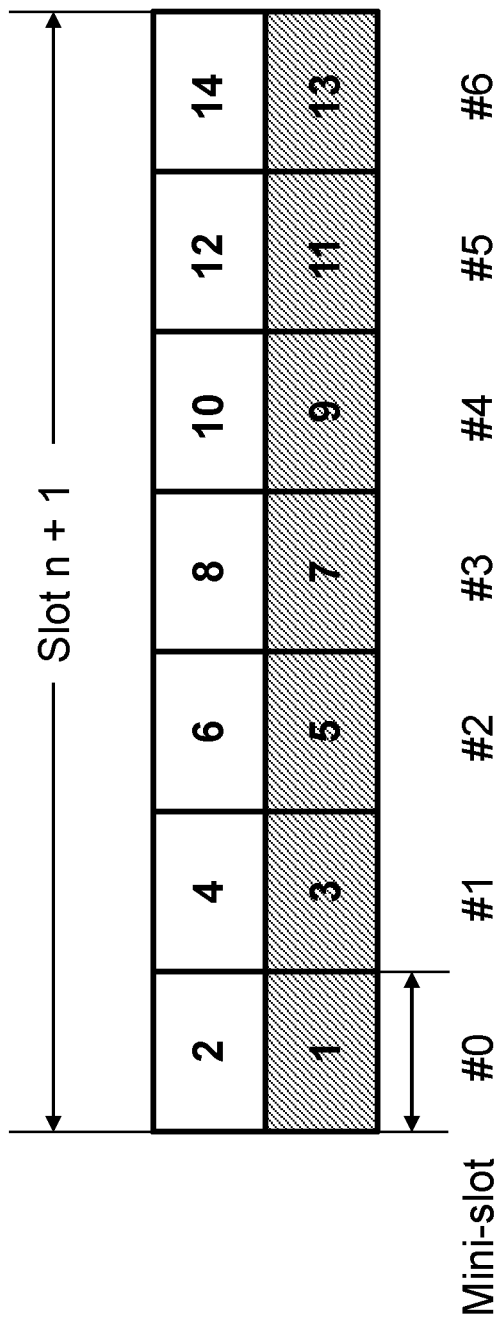
FIG. 11 illustrates an exemplary method for determining a manner of uplink transmission modification, in accordance with an embodiment of the present disclosure.

Specifically, as shown in FIG. 11, the shaded area represents the allocated eMBB uplink transmission resources in the RUR (slot n+1 in FIG. 11) corresponding to the received resource indication information. The resource indication information indicates that the resource occupancy in the current RUR is 11110000000000. Then, the UE recognizes that the indicated resource does not completely contain the resource allocated for the eMBB service. Therefore, it is determined that the resource currently occupied by the URLLC uplink transmission in the RUR is currently indicated. The UE identifies that the resource occupied by the URLLC uplink transmission in the resource indication information overlaps with the resource allocated by the eMBB service. That is, the sub-resource blocks 1 and 3 overlap. The UE determines that the transmission policy of the eMBB needs to be changed, for example, by adopting at least one of the following: stopping the uplink transmission from a beginning of an overlapping resource between the resource set and the first resource; canceling the uplink transmission as an entirety; performing uplink transmission based on a rate matching with respect to the overlapping resource; performing uplink transmission with a decreased power on part or all of the allocated resources; performing uplink transmission on a switched resource.

The above strategies will be specifically described in the following embodiments.

In the above manner, if the resources indicated in the resource indication information received by the UE do not overlap with the resources allocated for a certain type of service to the UE, the transmission strategy of the certain type of service is not required to be adjusted. In the above manner, if the resources allocated to the UE for a type of service are completely included in the resources indicated by the received resource indication information, there are two possibilities. First, the resource indication information does indicate the resource occupancy of this type of service. Second, the resource indication information indicates the resource occupancy of another type of service, and the resource for another type of service completely includes the resource allocated to the UE for the type of service. The terminal may adopt any of the following strategies: not adjusting the transmission strategy of the service; canceling the transmission of the service; transmitting the service on the allocated resource with a reduced power.

In a second example, a fixed bit of the resource indication information defines an indication information field, which is used to indicate the transmission policy of which type of service is to be adjusted, such as the fixed lowest one bit is used for the above indication, where the fixed lowest one bit=1 for URLLC, and the fixed lowest one bit=0 for eMBB. Specifically, when the bit position is 1, it indicates that when the resource indicated in the resource indication information overlaps with the URLLC service to be transmitted, the transmission policy of the URLLC uplink transmission is adjusted. At this time, even if the resource indicated in the resource indication information overlaps with the resource allocated for the eMBB service, the transmission policy of the eMBB service is not adjusted. When the bit position is 0, it indicates that when the resource indicated in the resource indication information overlaps with the eMBB service to be transmitted, the transmission policy of the eMBB uplink transmission is adjusted. At this time, even if the resource indicated in the resource indication information overlaps with the resource allocated for the URLLC service, the transmission policy of the URLLC service is not adjusted.

In a third example, two types of RNTIs are defined, such as E-RNTI and U-RNTI. Both of them can be used to scramble the CRC of the resource indication information. When the network side wants to adjust the URLLC uplink transmission policy, it indicates the resources occupied by the eMBB uplink transmission in the resource indication information, and scrambles the CRC of the resource indication information using the U-RNTI. At this time, in the RUR, a first UE having the URLLC uplink transmission resource allocation uses the U-RNTI to descramble the resource indication information to obtain the resource occupancy of the eMBB, and adjust the policy of the URLLC uplink transmission accordingly. At this time, in the RUR, when a second UE that has the eMBB uplink transmission resource allocation attempts to descramble the resource indication information using the E-RNTI, its descrambling will not be successful. As such, the resource indication information will not be obtained by the second UE. Therefore, the eMBB uplink transmission policy of the second UE does not need to be adjusted.

When the network side wants to adjust the eMBB uplink transmission policy, it indicates the resources occupied by the eMBB uplink transmission in the resource indication information, and scrambles the CRC of the resource indication information by the E-RNTI. Then in the RUR, a third UE that has the eMBB uplink transmission resource allocation uses the E-RNTI to descramble the resource indication information to obtain the resource occupancy of the URLLC, and adjusts the eMBB uplink transmission strategy accordingly. In this case, when a fourth UE that has the URLLC uplink transmission resource allocation attempts to descramble the resource indication information using the U-RNTI, its descrambling will not be successful. As such, the resource indication information will not be obtained by the fourth UE. Therefore, the URLLC uplink transmission policy of the fourth UE does not need to be adjusted In a fourth example, the network side indicates to the terminal, through RRC signaling, the transmission strategy of which type of service is to be adjusted when allocated resources for two types of services overlap. At this time, if the network side indicates that the transmission policy of the eMBB uplink transmission needs to be adjusted when the allocated resources for two types of services overlap, the network side will indicate the occupancy of the URLLC uplink transmission in the RUR in the resource indication information. Correspondingly, a UE that is only assigned with the URLLC uplink transmission in the RUR does not need to receive the resource indication information. Within the RUR, a UE that is assigned with the eMBB uplink transmission must receive the resource indication information and make a corresponding transmission policy adjustment when it is identified that there is an overlap between the assigned resource for eMBB and the URLLC uplink transmission resource. In one embodiment, the indication information can be broadcasted to all terminals through a system broadcast message.

In a fifth example, the transmission policy information can also be indicated by a sequence. For example, the transmission policy information is indicated by a DMRS sequence of the PDCCH. Specifically, as shown in FIG. 9, the shaded block 910 is a resource block (RB) mapped by the PDCCH. The PDCCH time domain is mapped on N symbols (e.g., 3 symbols), and each symbol in the frequency domain is mapped to M RBs (e.g., 16 RBs), for a total of 48 RBs. The PDCCH DMRS is mapped at a certain density in a part or all of the PDCCH RBs. The DMRS density shown in FIG. 9 is ¼, where 3 of 12 resource elements (REs) in an RB are REs 920 occupied by DMRS. Specifically, they are mapped on REs 1, 5, and 9.

It is assumed here that DMRSs on all PDCCH RBs are mapped according to the above density. The number of DMRS REs is 48*3=144 REs. The DMRS sequence is mapped to the DMRS RE. For example, defining a DMRS sequence whose length is equal to the number of DMRS REs, the DMRS sequence elements are sequentially mapped on the DMRS RE in the order of "first time domain, then frequency domain." That is, the lowest DMRS RE of the lowest PDCCH RB of the first PDCCH symbol is first mapped. Then it is sequentially mapped to the high frequency direction of the first PDCCH symbol. After all DMRS REs of the first PDCCH symbol are mapped, the second PDCCH symbol continues to be mapped, also in order of from low frequency to high frequency. The subsequent PDCCH symbols are mapped so on and so forth. The DMRS sequence may be a sequence of a specific length that is truncated from a longer sequence, or may be a sequence that is directly generated at a specific length. The length of the DMRS sequence is not limited to be equal to the number of DMRS REs. For example, the length of the DMRS sequence may also be smaller than the number of DMRS REs, and the information mapped to the DMRS RE is obtained by repeating the DMRS sequence elements or encoding DMRS by other means.

A plurality of DMRS sequences are defined to indicate different transmission policy information. For example, two DMRS sequences S1, S2 are defined. The protocol predefines the correspondence between the DMRS sequence and the transmission strategy as shown in Table 3. When the BS gNB inserts a certain DMRS sequence in the PDCCH transmission, it means to indicate to the terminal a corresponding service type whose transmission policy needs to be adjusted. Further, the UE uses S1 and S2 to perform correlation detection on the DMRS signal received on the specific time-frequency domain resource respectively. If it is determined that the currently received DMRS sequence is S1, the UE can determine that the service type whose transmission policy needs to be adjusted is URLLC.

TABLE 3

| DMRS Sequence | The type of service whose transmission policy needs to be adjusted |
|---|---|
| S1 | URLLC |
| S2 | eMBB |

The PDCCH for carrying the resource indication information may occupy a fixed time-frequency resource. In this case, the UE may perform correlation detection on the information received at the specific location. The PDCCH for carrying the resource indication information may also be transmitted on the selected resources in a certain time-frequency resource region. The time-frequency resource region in which the PDCCH may be mapped is defined as a control resource set, where the control resource set includes one or more candidate locations of the PDCCH, and the terminal needs to try to detect the PDCCH at each candidate location. In this case, for each candidate location, the UE may perform correlation detection of the DMRS sequence on the information received at the specific location, and further receive the PDCCH after successfully detecting the DMRS. In some other embodiment, the transmission policy information can also be carried by at least one of: mapping location of DMRS REs within a RB; DMRS sequence mapping order; orthogonal cover code scrambled on PDCCH DMRS sequence.

Figure 12:
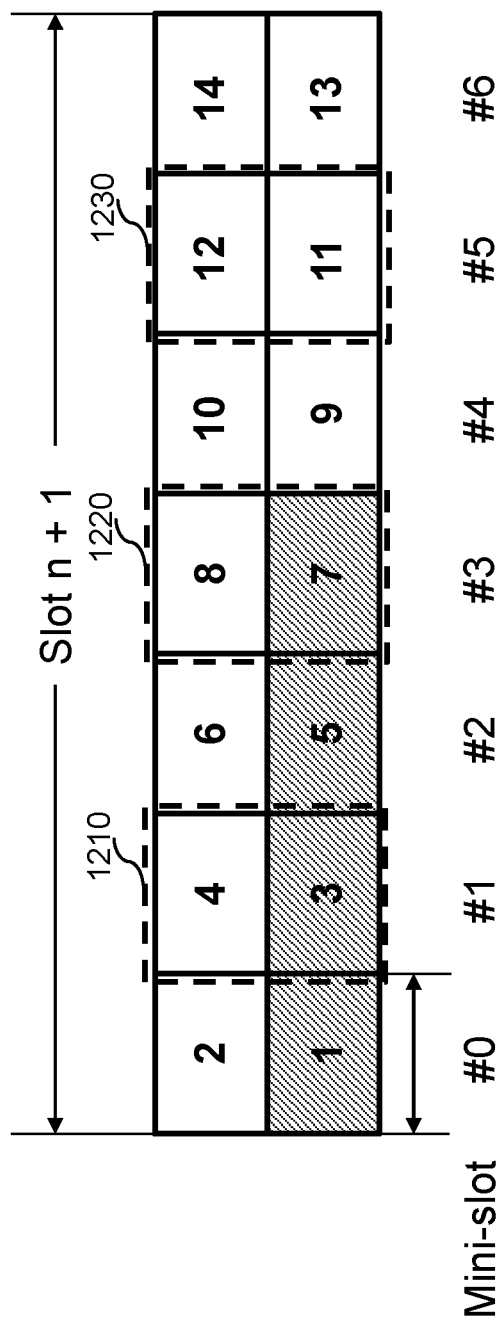
FIG. 12 illustrates an exemplary method for determining a manner of uplink transmission modification based on a backup resource, in accordance with an embodiment of the present disclosure.

In a fourth embodiment, a method for indicating a backup resource is described. When the grant free URLLC uplink transmission and the grant based eMBB uplink transmission coexist in the RUR, since the network side cannot predict whether the grant free resource is actually occupied by the URLLC uplink transmission, it is reasonable to indicate in the resource indication information the resource occupancy of the eMBB in the RUR. In this case, the transmission strategy for the URLLC uplink transmission can be adjusted. One way is to switch to a backup resource for the URLLC transmission. A backup resource can be indicated by the resource indication information to the UE that needs to transmit the URLLC service. As shown in FIG. 12, the dashed line frames 1210, 1220, 1230 represent the grant free URLLC uplink transmission resources, and the dark area represents the resources occupied by the eMBB uplink transmission. It can be seen that the grant free URLLC uplink transmission resource 1210 including the sub resource blocks 3 and 4, and the grant free URLLC uplink transmission resource 1220 including the sub resource blocks 7 and 8 are occupied by the eMBB uplink transmission. The network side may indicate the backup resources of the two grant free URLLC uplink transmission resources in the resource indication information dynamically. For example, the backup resources of the grant free URLLC uplink transmission resource 1210 including the sub resource blocks 3 and 4 are resources 9 and 10; the backup resources of the grant free URLLC uplink transmission resource 1220 including the sub resource blocks 7 and 8 are resources 13 and 14. When a certain UE is expected to send the URLLC uplink service on the grant free URLLC uplink transmission resource 1210 including the sub resource blocks 3 and 4, the UE can find out that the resource is occupied by reading the resource indication information, and that the corresponding backup resource is resources 9 and 10. Therefore, the UE will transmit the URLLC uplink service on resources 9 and 10.

The network side only needs to configure backup resources for overlapping grant free URLLC uplink transmission resources. In addition, since the grant free URLLC uplink transmission is delayed by several symbols, the delay requirement of the URLLC uplink transmission may not be satisfied. Therefore, the indicated backup resource may be a resource that has a same symbol but different frequency compared to the original grant free URLLC uplink transmission resource.

In a fifth embodiment, a method is disclosed for indicating power control assistance information. When a power control mechanism is adopted to realize the coexistence of the uplink transmission overlap of the two types of services, the size of the power adjustment is a parameter that needs to be determined. For example, the resource indication information indicates the eMBB uplink transmission resource, and the URLLC uplink transmission needs to boost its power transmission. At this time, since the resource indication information is with respect to multiple URLLC uplink transmissions, if the power boosting amount of each URLLC uplink transmission is indicated one by one, the overhead is relatively large. Another possible manner is to indicate, in the resource indication information, power level reference information corresponding to the eMBB uplink transmission resource. The power level reference information may be the transmit power of the eMBB uplink transmission on the sub resource block, or an expected receiving power of the eMBB uplink transmission on the sub-resource block when the base station receives the eMBB uplink transmission. This information can assist the UE to determine the amount of power boosting of the URLLC uplink transmission, i.e. to estimate the amount of interference that the URLLC uplink transmission may receive, and correspondingly increase the transmission power of the URLLC.

Specifically, the eMBB power level or the expected receiving power level of the base station may be quantized into several levels, such as four levels, corresponding to different levels of eMBB power, and corresponding to different interference values to be suffered by the URLLC uplink transmission. The 4 levels are indicated by 2 bits. For a certain level of interference, the URLLC calculates the power boost value based on its original transmit power. A simple way is that the power boost value is equal to the interference value, while other calculation methods are also applicable.

Correspondingly, the resource indication information may indicate the URLLC uplink transmission resource, where the eMBB uplink transmission needs to reduce its power transmission. In this case, the power level reference information corresponding to the URLLC uplink transmission resource is indicated in the resource indication information, where the power level reference information may be the transmission power of the URLLC uplink transmission on the sub resource block, or an expected receiving power of the URLLC uplink transmission on the sub-resource block when the base station receives the URLLC uplink transmission. This information can be used as a reference for the UE to determine the amount of power reduction for the eMBB uplink transmission.

A sixth embodiment discloses different types of adjustment policies for uplink transmission and how the terminal determines which adjustment policy to use. When the resources allocated for the uplink transmissions of the two types of services overlap, the transmission strategy of the uplink transmission of a certain type of service needs to be adjusted, so as to better ensure the transmission of the service with a high performance requirement. This embodiment shows details for different types of adjustment policies.

For eMBB uplink transmission, the possible transmission policy adjustment includes at least one of: stopping the designated uplink transmission; canceling the entire uplink transmission; performing uplink transmission based on a rate matching with respect to the overlapping resource; performing uplink transmission with reduced power on part or all of the allocated resources; and switching resources for uplink transmissions.

For the URLLC uplink transmission, the possible transmission policy adjustment includes at least one of: performing uplink transmission based on a rate matching with respect to the overlapping resource; performing uplink transmission with the boosted power on part or all of the allocated resources; and switching resources for uplink transmissions.

Figure 13:
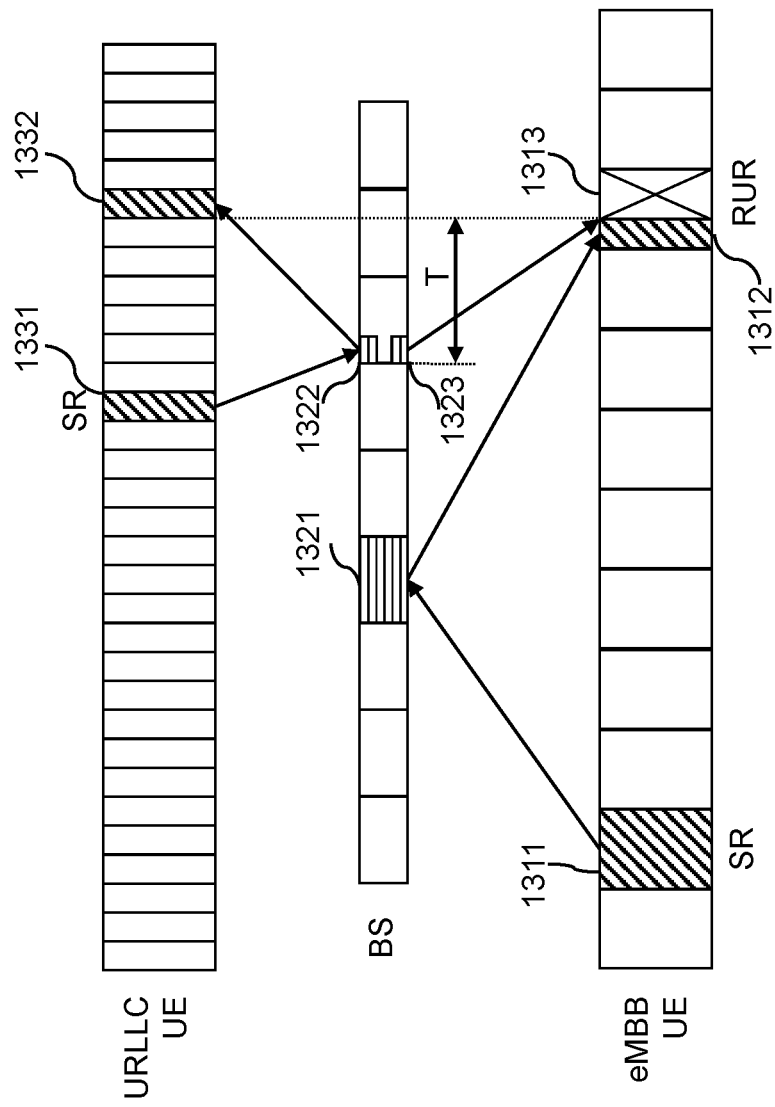
FIG. 13 illustrates an exemplary method of stopping an uplink transmission based on indication information, in accordance with an embodiment of the present disclosure.

According to a first adjustment policy, the designated uplink transmission is stopped. As shown in FIG. 13, the BS allocates transmission resources 1312, 1313 for the eMBB service according to the eMBB uplink transmission scheduling request (SR) 1311 of the eMBB UE, and sends the indication of the resource information 1312, 1313 to the eMBB UE through the UL grant1 1321.

Before the eMBB uplink service transmission, the URLLC UE also requests URLLC uplink transmission resource by sending the SR 1331. The BS allocates the resource 1332 for transmitting the URLLC uplink service to the URLLC UE through the UL grant2 1322. The resource 1332 partially overlaps with the resource 1313 previously allocated to the eMBB uplink service. In this embodiment, the UL grant2 1322 is simultaneously transmitted with the resource indication information 1323. The starting point of the RUR is defined as a symbol having an interval T from the resource indication information starting symbol, where T at least satisfies the delay requirement for the eMBB UE to decode resource indication information. After the eMBB UE identifies the resource indication information and determines the resource 1332, 1313 occupied by the URLLC uplink transmission, the eMBB UE stops the transmission of the eMBB service from the start of the transmission of the URLLC service. The operation of stopping the uplink transmission described above is also applicable when the resource indication information indicates the resource occupied by the eMBB uplink transmissions, and the URLLC UE stops the URLLC uplink transmission from the beginning of the overlapping resource according to the resource indication.

According to a second adjustment policy, the entire uplink transmission is cancelled. In this case, according to the previous embodiments, after determining that the resource allocated for own service overlaps with the resource occupied by another type of service indicated in the resource indication information, the UE cancels the entire uplink transmission. Specifically, in the scenario described in FIG. 13, the eMBB UE will cancel the entire eMBB uplink transmission on resources 1312, 1313. The operation of canceling the entire uplink transmission described above is also applicable when the resource indication information indicates the resource occupied by the eMBB uplink transmissions, and the URLLC UE cancels the entire URLLC uplink transmission according to the resource indication.

According to a third adjustment policy, the uplink transmission is performed based on a rate matching with respect to the overlapping resource. In this case, according to the previous embodiments, after determining that the resource allocated for own service overlaps with the resource occupied by another type of service indicated in the resource indication information, the UE skips the overlapping resource and utilizes the non-overlapping resources to continue the uplink transmission.

Figure 14:
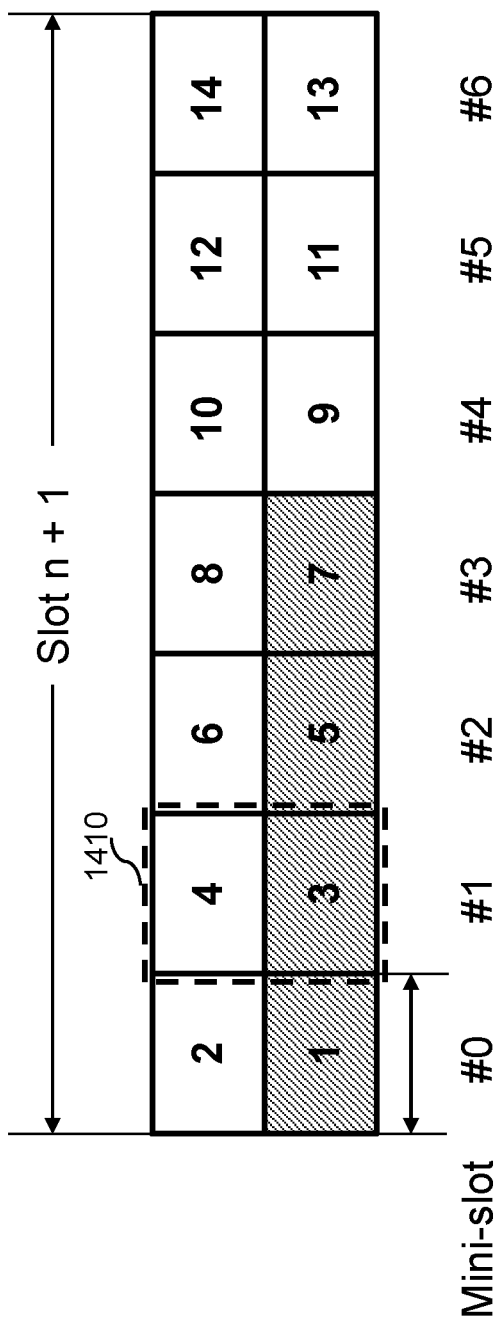
FIG. 14 illustrates an exemplary method of performing an uplink transmission based on a rate matching scheme, in accordance with an embodiment of the present disclosure.

Specifically, as shown in FIG. 14, the shaded area represents the resource allocated for the eMBB uplink transmission, and the resource in the dashed line frame 1410 is the resource allocated for the URLLC uplink transmission. The base station notifies the URLLC uplink transmission resource to the eMBB UE by the resource indication information. In this case, the sub-resource block 3 will no longer be available to the eMBB UE. The eMBB UE will continue the eMBB uplink transmission on sub-resource blocks 1, 5, and 7. There are four possible schemes to perform the eMBB uplink transmission in this case. In scheme 1, the code rate is increased for the eMBB uplink transmission without changing the TB block size of the eMBB uplink transmission. In scheme 2, the code rate is unchanged while correspondingly reducing the TB size of the eMBB uplink transmission. In scheme 3, the TB size of the eMBB uplink transmission is unchanged while correspondingly reducing; the sub-resource blocks before the overlapping resources (such as the sub-resource block 1 in FIG. 14) are still transmitted according to the original code rate; and the sub-resource blocks after the overlapping resources (such as the sub-resource blocks 5 and 7 in FIG. 14) are transmitted according to a recalculated code rate. In scheme 4, the sub-resource blocks before the overlapping resources (such as the sub-resource block 1 in FIG. 14) are still transmitted according to the original code rate; for the sub-resource blocks after the overlapping resources (such as sub-resource blocks 5 and 7 in FIG. 14), a code rate is calculated for transmitting the remaining bits using the remaining resources. The recalculated code rate is compared with a predefined code rate threshold. When the recalculated code rate is lower than the code rate threshold, the recalculated code rate is used for the uplink transmission; when the recalculated code rate is higher than the code rate threshold, the original code rate is used for the uplink transmission.

The UE and the BS may pre-agree on a manner adopted according to any of the above four schemes, e.g. by a predefined protocol, or by a configuration of the BS using RRC signaling. In one embodiment, both scheme 1 and scheme 2 are supported by the system, and a resource occupation threshold is preset. When the allocated eMBB resource is occupied by a portion more than the preset resource occupation threshold, scheme 2 is adopted. When the allocated eMBB resource is occupied by a portion less than or equal to the preset resource occupation threshold, scheme 1 is adopted. The resource occupancy threshold may be a proportion of resource occupancy, e.g. 20%, or an absolute number of resources occupied, such as the number of RBs, the number of symbols, or the number of RBs multiplied by the number of symbols. The scheme 3 may be applicable when the UE has no time to change the data transmission mechanism in the sub-resource blocks before the overlapping resource. For the sub-resource blocks after the overlapping resource, the UE has time to re-determine the transmission mechanism according to the new resource size. The operation of performing the uplink transmission based on the overlapping resource rate matching described above is also applicable when the resource indication information indicates the resource occupied by the eMBB uplink transmissions, and the URLLC UE performs the uplink transmission based on the overlapping resource rate matching according to the resource indication.

According to a fourth adjustment policy, the uplink transmission is performed with a reduced power on part or all of the allocated resources. In the scenario when two types of services have multiplexing transmission resources as shown in FIG. 14, the eMBB UE may also choose to reduce its transmission power of the eMBB on some or all of the allocated resources to reduce interference to the URLLC uplink transmission.

Specifically, only the eMBB uplink transmission on the overlapping resource (e.g. the sub-resource block 3 in FIG. 14) is transmitted with a reduced power. The amount of power reduction may be predefined in the protocol or pre-configured by RRC signaling. Alternatively, the transmission power is reduced for all resources allocated for the eMBB uplink transmission, and the amount of power reduction may be predefined in the protocol or pre-configured by RRC signaling.

Figure 15:
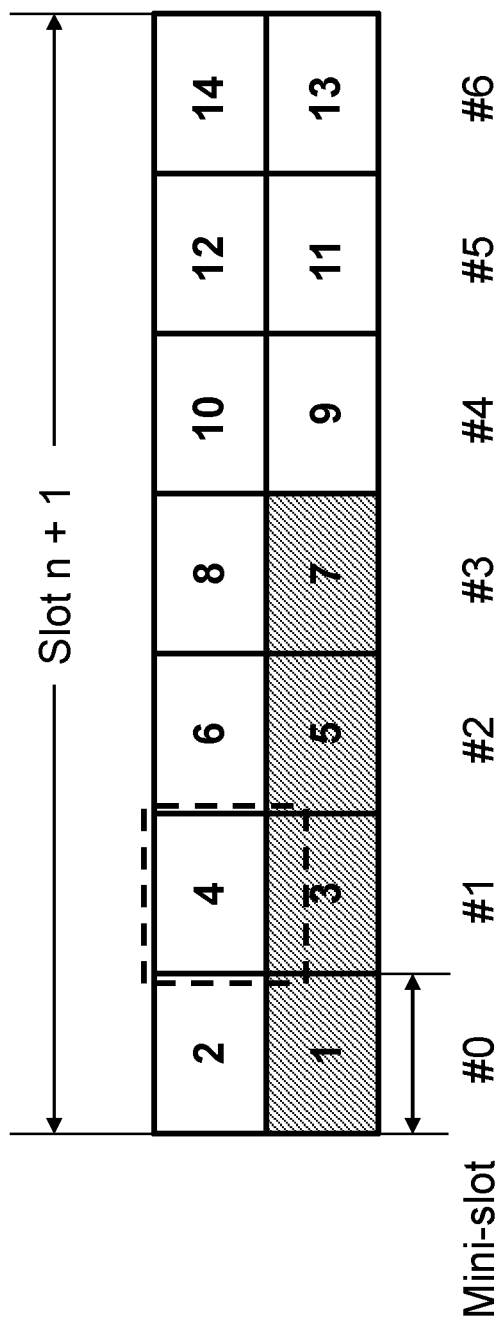
FIG. 15 illustrates an exemplary method of performing an uplink transmission with a decreased transmission power, in accordance with an embodiment of the present disclosure.

Another scenario is shown in FIG. 15. There is a partial overlap in the frequency domain. The transmission power may be reduce according to three schemes. First, the power is reduced only for RE in the overlapping part (e.g. the overlapping region between sub resource blocks 3 and 4 in FIG. 15). Second, the power is reduced for all REs in the symbol where the overlapping part is located. That is, the power is reduced for all eMBB uplink transmissions in the range of sub resource block 3 of FIG. 15. Third, the power is reduced for all resources allocated for the eMBB uplink transmission. In each scheme, the amount of power reduction can be predefined in the protocol or pre-configured by RRC signaling. Which power reduction scheme is specifically adopted may be predefined by the system, or notified by RRC signaling, or flexibly implemented by the UE itself.

According to a fifth adjustment policy, the uplink transmission is performed with an increased power on part or all of the allocated resources. In the scenario when two types of services have multiplexing transmission resources as shown in FIG. 14, the eMBB UE may also choose to reduce its transmission power of the eMBB on some or all of the allocated resources to reduce interference to the URLLC uplink transmission.

Figure 16:
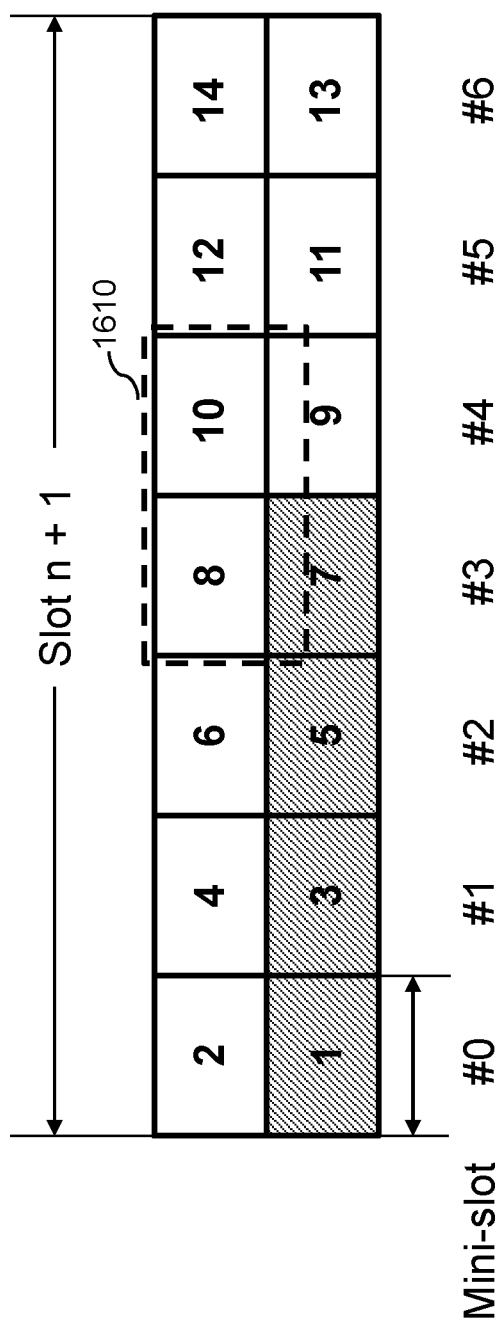
FIG. 16 illustrates an exemplary method of performing an uplink transmission with an increased transmission power, in accordance with an embodiment of the present disclosure.

Similar to the fourth adjustment policy, when the transmission strategy of the URLLC service needs to be adjusted, the URLLC uplink transmission on overlapping resource should be transmitted with an increased power. As shown in FIG. 16, the shaded area is the resource allocated for the eMBB uplink transmission, the resource in the dashed line frame 1610 is the resource allocated for the URLLC uplink transmission. The base station notifies the eMBB uplink transmission resource to the URLLC UE using the resource indication information.

Correspondingly, the transmission power may be increased according to three schemes. First, the power is increased only for RE in the overlapping part (e.g. the overlapping region between sub resource block 7 and the dashed line frame 1610 in FIG. 16). Second, the power is increased for all REs in the symbol where the overlapping part is located. That is, the power is increased for all URLLC uplink transmissions in the range of sub resource block 7 of FIG. 16. Third, the power is increased for all resources allocated for the URLLC uplink transmission. In each scheme, the amount of power increase can be predefined in the protocol or pre-configured by RRC signaling. Which power increasing scheme is specifically adopted may be predefined by the system, or notified by RRC signaling, or flexibly implemented by the UE itself.

Figure 17:
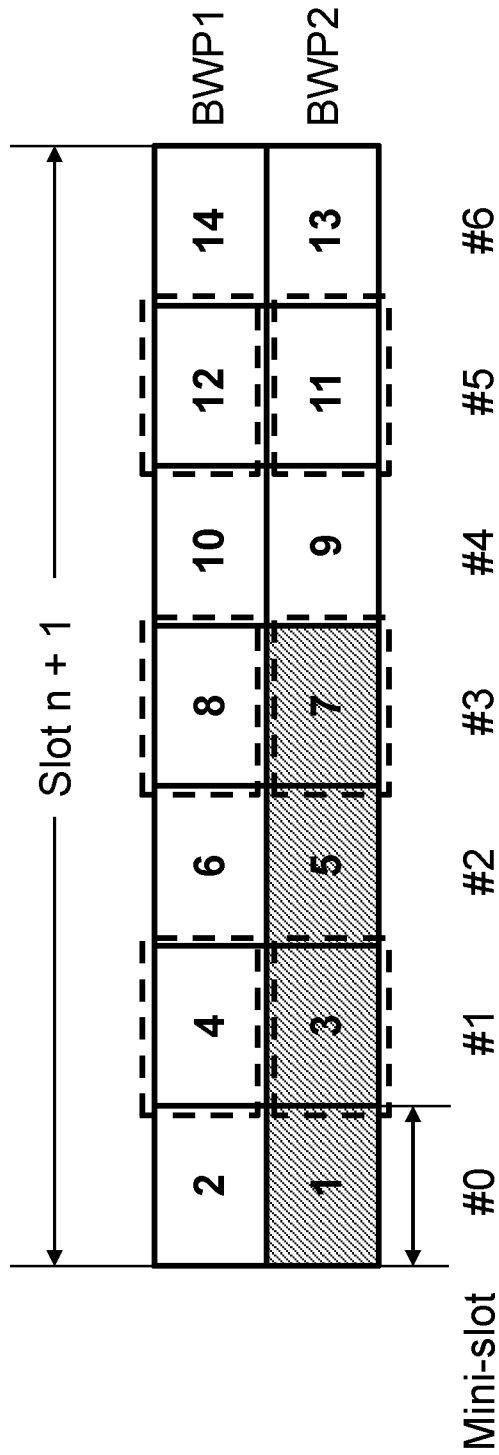
FIG. 17 illustrates an exemplary method of performing an uplink transmission on a resource that has no overlap with the indicated resources, in accordance with an embodiment of the present disclosure.

According to a sixth adjustment policy, the uplink transmission is performed on switched resources. As shown in FIG. 17, multiple sets of grant free resources are configured for the grant free URLLC. In FIG. 17, the dashed boxes 3, 7, 11 in the bandwidth part 2 (BWP2) are defined as "primary grant free resources." For each "primary grant free resource," a corresponding "secondary grant free resource" (e.g. the dashed box 4, 8, or 12 in the BWP1) is defined. A "primary grant free resource" and its corresponding "secondary grant free resource" are defined as "grant free resource group." The resource indication information indicates the resource occupied by the eMBB uplink transmission. When the URLLC UE expects the resource allocated for the URLLC uplink service to overlap with the eMBB resource, the URLLC UE will transmit the URLLC uplink service on the corresponding "secondary grant free resource". Specifically, the URLLC UE expected to send the URLLC uplink service on the sub-resource block 3. By reading the resource indication information, the URLLC UE knows that the sub-resource block 3 is allocated to the eMBB uplink transmission. Therefore, the URLLC UE will send the URLLC uplink service on the sub-resource block 4.

The "primary grant free resource" and the "secondary grant free resource" may also have a many-to-one relationship. That is, define a "secondary grant free resource" for a plurality of "primary grant free resources." When any resource allocated for the URLLC services on the plurality of "primary grant free resources" is assigned to the eMBB uplink service, the URLLC uplink service can be switched to the "secondary grant free resource". In addition, the "primary grant free resource" and the "secondary grant free resource" are for a certain UE or a group of UEs. Two or more bound grant free resources may be "primary and secondary" to each other. For example, for UE1, sub-resource block 3 is its primary grant free resource, and sub-resource block 4 is a secondary grant free resource corresponding to the sub-resource block 3; at the same time, for UE2, sub-resource block 4 is its primary grant free resource, and sub-resource block 3 is a secondary grant free resource corresponding to the sub-resource block 4.

The binding relationship of two or more grant free resources, and which one is the primary grant free resource for a specific UE, may be configured to the UE through RRC signaling. Optionally, when multiple grant free resources are bound, the secondary grant free resources have an occupation order. That is, when the primary grant free resource is occupied, the UE will find the highest-order secondary grant free resource to send the URLLC service. Preferably, the URLLC UE needs to listen to resource indication information corresponding to each of the bound grant free resources. Preferably, two or more grant free resources are configured on different frequency domain resources of the same symbol, so as to avoid an increased transmission delay of URLLC service due to the conflict with the eMBB service.

According to another adjustment policy, the uplink transmission is performed based on a puncture scheme. The eMBB UE will drop some of the eMBB uplink information mapping in the overlapping resources, and continue to transmit remaining eMBB UL information mapping in the non-overlapping resources.

The multiple policy adjustment types described above may be selected based on rules agreed by the network side and the UE. Alternatively, the network side may indicate to the terminal the currently adopted policy adjustment type in a specific manner. The indication method described in the third embodiment can also be used as a manner in which the network side indicates the type of policy adjustment to the terminal.

Figure 18:
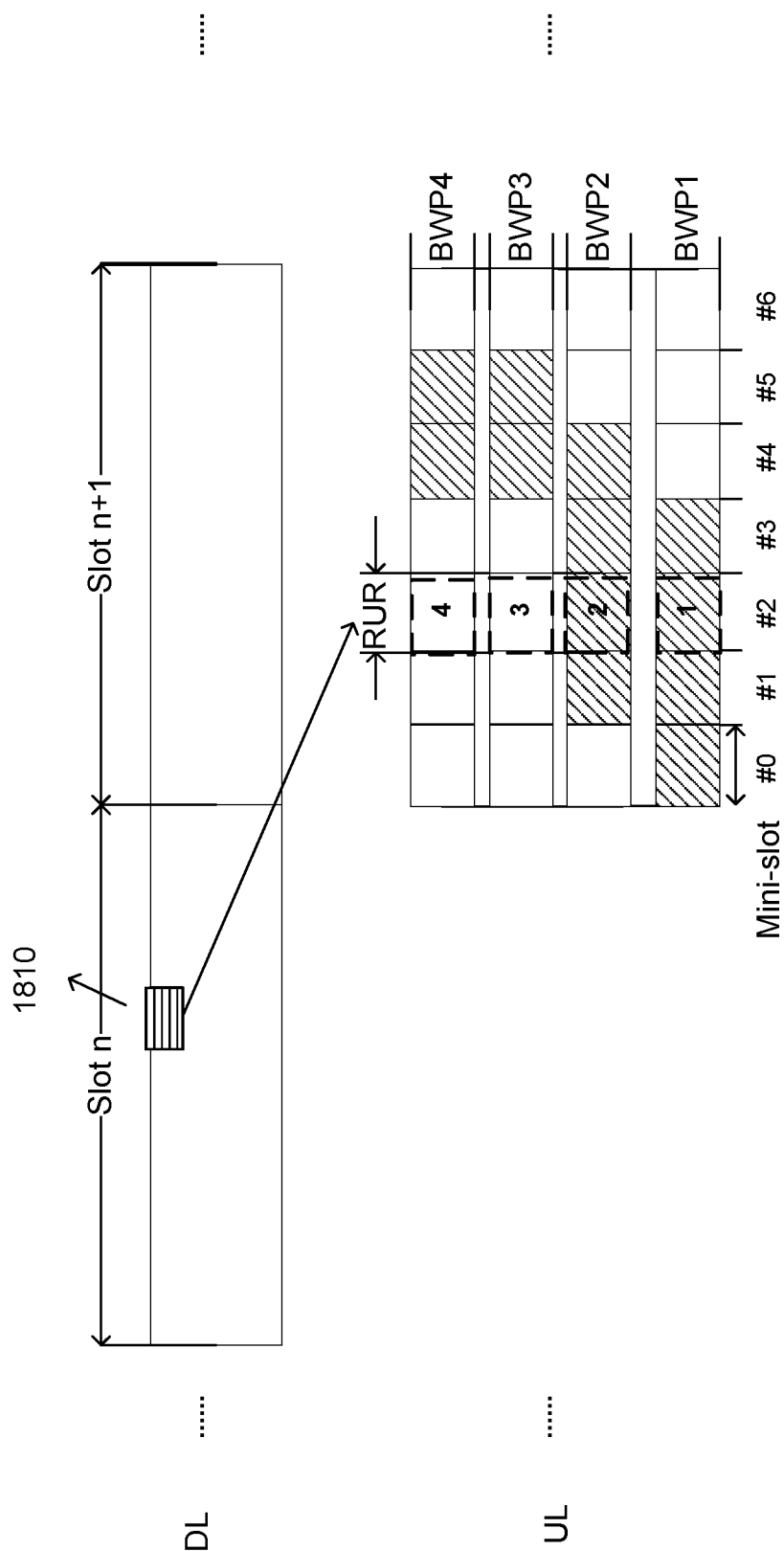
FIG. 18 illustrates an exemplary method of modifying an uplink transmission based on a group of resources ordered by priority levels, in accordance with an embodiment of the present disclosure.

In a seventh embodiment, resource indication information is used to indicate resource occupancy of multiple grant free resources in a grant free resource group. As shown in FIG. 18, the RUR is predefined with a mini-slot (such as two symbols) duration, and includes a group of bound grant free resources in the RUR range, i.e. sub-resource blocks 1, 2, 3, and 4 in FIG. 18. The resource indication information 1810 corresponding to the RUR indicates the resource occupancy by the eMBB on the sub-resource blocks in which the group of grant free resources is located. The order of indication is predefined, e.g., in the order from low frequency to high frequency. When the RUR includes multiple sub-resource blocks in the time domain, it may be indicated in the order of "first frequency domain and then time domain". Specifically, in FIG. 18, 4 bits are required to indicate the occupation of 4 sub-resource blocks. For example, 1100 represent the occupation of sub-resource blocks 1, 2, 3, 4, where bit 1 represents a sub-resource block occupied by eMBB, and bit 0 represents a sub-resource block not occupied by eMBB.

In one embodiment, for a specific UE1, the RRC signaling is used to configure the grant free resource on the BWP1 as its "primary grant free resource." For the RUR range considered here, the "primary grant free resource" is specifically the sub-resource block 1 in FIG. 18. The other three grant free resources are "secondary grant free resources", and the order of resource occupation is BWP2→BWP3→BWP4. Therefore, when the UE expected to send the URLLC uplink service on the sub-resource block 1, according to the resource indication information, the UE can determine that the "primary grant free resource" has been allocated to the eMBB uplink transmission. As such, the UE needs to switch to the "secondary grant free resource" for the URLLC uplink transmission. In addition, the UE determines, according to the occupation priority of the three "secondary grant free resources", to perform the URLLC uplink transmission on the sub-resource block 3 of the BWP3.

For another UE2, the RRC signaling is used to pre-configure a set of grant free resources for the UE2, where the "primary grant free resource" is the grant free resource on BWP2. For the RUR range considered here, the "primary grant free resource" is sub-resource block 2 in FIG. 18. The other three grant free resources are "secondary grant free resources", and the order of resource occupation is BWP1→BWP4→BWP3. Therefore, when this UE expected to send URLLC uplink service on sub-resource block 2, according to the resource indication information, the UE can determine that the "primary grant free resource" has been allocated to the eMBB uplink transmission. As such, the UE needs to switch to the "secondary grant free resource" for the URLLC uplink transmission. In addition, the UE determines, according to the occupation priority of the three "secondary grant free resources", to perform the URLLC uplink transmission on the sub-resource block 4 of the BWP4. It is also possible to define the priority order of all the grant free resources in the grant free resource group without distinguishing the primary and secondary grant free resources in the grant free resource group. In this case, the grant free resource with the highest priority is equivalent to the "primary grant free resource" mentioned above.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
    transmitting from a wireless communication node indication information to a first wireless communication device, wherein the indication information indicates to the first wireless communication device a resource set of resources configured for uplink transmissions related to at least one type of service by at least one second wireless communication device;
    transmitting from the wireless communication node policy indication information to the first wireless communication device; and
    modifying by the first wireless communication device, based on the policy indication information, an uplink transmission of the first wireless communication device in response to an overlap between the resource set and a first resource assigned to the first wireless communication device for the uplink transmission, wherein the uplink transmission is related to a type of service different from the at least one type of service.

2. The method of claim 1, wherein the resource set comprises at least one of:
    a first resource set of all resources configured for uplink transmissions related to a first type of service within a given time period;
    a second resource set of all resources configured for uplink transmissions related to a second type of service within the given time period;
    a third resource set that is an intersection of the first resource set and the second resource set.

3. The method of claim 2, wherein:
    the first type of service has a higher reliability requirement or a lower latency requirement than the second type of service.

4. The method of claim 1, wherein the resource set comprises:
    a first resource set of all resources configured for uplink transmissions related to a first type of service within a first time period; and
    a second resource set of all resources configured for uplink transmissions related to a second type of service within a second time period.

5. The method of claim 1, wherein the indication information is transmitted through at least one of:
    a downlink control information (DCI) on a physical downlink control channel (PDCCH);
    a radio resource control (RRC) signaling; and
    a demodulation reference signal (DMRS) of a PDCCH.

6. The method of claim 1, wherein the policy indication information is carried by at least one of:
    a fixed bit field in the indication information;
    a demodulation reference signal (DMRS) of a physical downlink control channel (PDCCH);
    a radio resource control (RRC) signaling to the first wireless communication device; and
    a radio network temporary identifier (RNTI) scrambling cyclic redundancy check (CRC) of the indication information, wherein the RNTI is associated with a group of wireless communication devices or shared by all wireless communication devices associated with the wireless communication node.

7. The method of claim 1, wherein the policy indication information indicates the first wireless communication device to modify the uplink transmission by at least one of:
    stopping the uplink transmission from a beginning of an overlapping resource between the resource set and the first resource;
    canceling the uplink transmission as an entirety;
    performing the uplink transmission based on a rate matching scheme;
    performing the uplink transmission based on a puncture scheme;
    performing the uplink transmission on a backup resource;
    performing the uplink transmission with a decreased transmission power on at least part of the first resource;
    performing the uplink transmission with an increased transmission power on at least part of the first resource;
    performing the uplink transmission on a second resource that has no overlap with the resource set.

8. The method of claim 7, wherein:
    wherein the policy indication information indicates the first wireless communication device to modify the uplink transmission by at least performing the uplink transmission on the second resource that has no overlap with the resource set;

the first resource and the second resource belong to a resource group assigned to the first wireless communication device for the uplink transmission;

each resource in the resource group has a priority level; and the second resource has a highest priority level among resources in the resource group that have no overlap with the resource set.

9. The method of claim 1, wherein the indication information further indicates, in response to an overlap between the resource set and a first resource assigned to the first wireless communication device for an uplink transmission, a backup resource for the first resource.

10. The method of claim 1, wherein the indication information further indicates, in response to an overlap between the resource set and a first resource assigned to the first wireless communication device for an uplink transmission, a power modification parameter for the first wireless communication device to modify its transmission power of the uplink transmission.

11. A method performed by a first wireless communication device, the method comprising:

receiving indication information from a wireless communication node; and determining, based on the indication information, a resource set of resources configured for uplink transmissions related to at least one type of service by at least one second wireless communication device;

obtaining policy indication information from the wireless communication node; and modifying, based on the policy indication information, an uplink transmission of the first wireless communication device in response to an overlap between the resource set and a first resource assigned to the first wireless communication device for the uplink transmission, wherein the uplink transmission is related to a type of service different from the at least one type of service.

12. The method of claim 11, wherein the resource set comprises at least one of:

a first resource set of all resources configured for uplink transmissions related to a first type of service within a given time period;

a second resource set of all resources configured for uplink transmissions related to a second type of service within the given time period;

a third resource set that is an intersection of the first resource set and the second resource set.

13. The method of claim 12, wherein:

the first type of service has a higher reliability requirement or a lower latency requirement than the second type of service.

14. The method of claim 11, wherein the resource set comprises:

a first resource set of all resources configured for uplink transmissions related to a first type of service within a first time period; and a second resource set of all resources configured for uplink transmissions related to a second type of service within a second time period.

15. The method of claim 11, wherein the indication information is received through at least one of:

a downlink control information (DCI) on a physical downlink control channel (PDCCH) from the wireless communication node;

a demodulation reference signal (DMRS) of a PDCCH from the wireless communication node; and a radio resource control (RRC) signaling from the wireless communication node.

16. The method of claim 11, wherein the policy indication information is obtained through at least one of:

a fixed bit field in the indication information;

a demodulation reference signal (DMRS) of a physical downlink control channel (PDCCH);

a radio resource control (RRC) signaling from the wireless communication node; and a radio network temporary identifier (RNTI) scrambling cyclic redundancy check (CRC) of the indication information, wherein the RNTI is associated with a group of wireless communication devices or shared by all wireless communication devices associated with the wireless communication node.

17. The method of claim 11, wherein modifying the uplink transmission comprises at least one of:

stopping the uplink transmission from a beginning of an overlapping resource between the resource set and the first resource;

canceling the uplink transmission as an entirety;

performing the uplink transmission based on a rate matching scheme;

performing the uplink transmission based on a puncture scheme;

performing the uplink transmission on a backup resource;

performing the uplink transmission with a decreased transmission power on at least part of the first resource;

performing the uplink transmission with an increased transmission power on at least part of the first resource;

performing the uplink transmission on a second resource that has no overlap with the resource set.

18. The method of claim 17, wherein:

wherein the policy indication information indicates the first wireless communication device to modify the uplink transmission by at least performing the uplink transmission on the second resource that has no overlap with the resource set;

the first resource and the second resource belong to a resource group assigned to the first wireless communication device for the uplink transmission;

each resource in the resource group has a priority level; and the second resource has a highest priority level among resources in the resource group that have no overlap with the resource set.

* * * * *